(12) United States Patent
Sethumadhavan et al.

(10) Patent No.: US 9,098,700 B2
(45) Date of Patent: Aug. 4, 2015

(54) SYSTEMS AND METHODS FOR DETECTING ATTACKS AGAINST A DIGITAL CIRCUIT

(75) Inventors: Lakshminarasimhan Sethumadhavan, New York, NY (US); Adam Waksman, Pleasantville, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 261 days.

(21) Appl. No.: 13/580,121

(22) PCT Filed: Feb. 28, 2011

(86) PCT No.: PCT/US2011/026516
§ 371 (c)(1),
(2), (4) Date: Nov. 19, 2012

(87) PCT Pub. No.: WO2011/156021
PCT Pub. Date: Dec. 15, 2011

(65) Prior Publication Data
US 2013/0061322 A1 Mar. 7, 2013

Related U.S. Application Data

(60) Provisional application No. 61/309,194, filed on Mar. 1, 2010.

(51) Int. Cl.
*G06F 21/00* (2013.01)
*G06F 21/55* (2013.01)
(Continued)

(52) U.S. Cl.
CPC .......... *G06F 21/554* (2013.01); *G06F 9/30145* (2013.01); *G06F 9/3867* (2013.01);
(Continued)

(58) Field of Classification Search
CPC .......... G06F 21/00; G06F 12/14; G06F 15/16
USPC ..................... 726/23, 22, 25, 26, 34
See application file for complete search history.

(56) References Cited

U.S. PATENT DOCUMENTS 5,237,671 A   8/1993   Freitas et al.
5,961,644 A   10/1999  Kurtzberg et al.
(Continued)

FOREIGN PATENT DOCUMENTS

TW   200707254 A   2/2007
TW   200741504 A   11/2007
(Continued)

OTHER PUBLICATIONS

Shimpi, A. L. (2008, Feb. 20). Intel's Silverthorne Unveiled: Detailing Baby Centrino. [Web log post]. Retrieved from http://www.anandtech.com/show/2449.
(Continued)

*Primary Examiner* — Jeffrey Pwu
*Assistant Examiner* — Samuel Ambaye
(74) *Attorney, Agent, or Firm* — Hunter Clark PLLC

(57) ABSTRACT

Systems and methods for detecting design-level attacks against a digital circuit which includes various functional units. A target unit is selected from among the functional units for monitoring and a predictor unit is arranged to receive events before they reach the target unit. A reactor unit is selected from among the functional units of the digital circuit which are arranged to receive events after they pass through the target unit. A monitor unit is arranged to receive predicted event messages from the predictor unit and actual event messages from the reactor unit. The monitor unit is configured to indicate an alarm based on a comparison of the predicted event messages received from the predictor unit and the actual event messages received from the reactor unit.

28 Claims, 13 Drawing Sheets

(51) Int. Cl.
  G06F 9/30 (2006.01)
  G06F 9/38 (2006.01)
  G06F 21/71 (2013.01)
  *G06F 15/16* (2006.01)
  *G06F 12/14* (2006.01)

(52) U.S. Cl.
  CPC .............. *G06F 21/00* (2013.01); *G06F 21/71* (2013.01); *G06F 12/14* (2013.01); *G06F 15/16* (2013.01); *G06F 2221/2101* (2013.01)

(56) References Cited

U.S. PATENT DOCUMENTS

| | | | |
|---|---|---|---|
| 7,663,479 | B1 | 2/2010 | Bajpay et al. |
| 2002/0169969 | A1 | 11/2002 | Watanabe et al. |
| 2005/0151777 | A1 | 7/2005 | Silverbrook |
| 2005/0204404 | A1 | 9/2005 | Hrabik et al. |
| 2005/0273858 | A1* | 12/2005 | Zadok et al. ............... 726/24 |
| 2006/0242702 | A1 | 10/2006 | McIntosh et al. |
| 2007/0245417 | A1 | 10/2007 | Lee et al. |
| 2008/0319729 | A1 | 12/2008 | Copty et al. |
| 2010/0050266 | A1* | 2/2010 | Cheng et al. ............... 726/26 |

FOREIGN PATENT DOCUMENTS

| | | | |
|---|---|---|---|
| WO | 9840833 | A1 | 9/1998 |
| WO | 2005048062 | A1 | 5/2005 |
| WO | 2009057098 | A1 | 5/2009 |

OTHER PUBLICATIONS

ITRS. (2007). International Technology Roadmap for Semiconductors 2007 Edition: Design. Retrieved from http://www.itrs.net/Links/2007ITRS/2007_Chapters/2007_Design.pdf.
Wilson, R. (Jun. 10, 2008). Latest from DAC: ST and Media Tek manage media SoC designs (part 2). [Web log post]. Retrieved from http://www.edn.com/electronics-blogs/practical-chip-design/4309168/Latest-from-DAC-ST-and-Media-Tek-manage-media-SoC-designs-part-2-.
Trusted Computing Group. (2007) Home Page Captured on Feb. 22, 2008 from https://www.Trustedcomputinggroup.org/,2007 by Internet Archive as http://web.archive.org/web/20080222212626/https://www.trustedcomputinggroup.org/home.
Aciiçmez, O. (Nov. 2007). Yet another microarchitectural attack: exploiting I-cache. Proceedings of the 2007 ACM Workshop on Computer Security Architecture (CSAW '07). 11-18. ACM.
Aciiçmez, O., Gueron, S., & Seifert, J. P. (Feb. 7, 2007). New Branch Prediction Vulnerabilities in OpenSSL and Necessary Software Countermeasures. Cryptography and Coding. Lecture Notes in Computer Science, 4887, 185-203. Springer Berlin Heidelberg. Retrieved from Cryptology ePrint Archive, Report 2007/039, https://eprint.iacr.org/2007/039.pdf.
Aciiçmez, O., Koç, ç. K., & Seifert, J. P. (Mar. 20, 2007). On the power of simple branch prediction analysis. Proceedings of the 2nd ACM Symposium on Information, Computer and Communications Security (ASIACCS '07), 312-320. ACM. Retrieved from http://www.researchgate.net/publication/220334238_On_the_Power_of_Simple_Branch_Prediction_Analysis/file/e0b495260d8da330f4.pdf.
Aciiçmez, O., KOç, ç. K., & Seifert, J. P. (2006). Predicting secret keys via branch prediction. Topics in Cryptology—CT-RSA 2007, 4377, 225-242. Springer Berlin Heidelberg.
Aciiçmez, O., Schindler, W., & KOç, ç. K. (2006). Cache based remote timing attack on the AES. Topics in Cryptology—CT-RSA 2007, 4377, 271-286. Springer Berlin Heidelberg.
Adee, S. (2008, May). The Hunt for The Kill Switch. Spectrum, IEEE Spectrum Magazine, 45(5), 34-39.
Agosta, G., Breveglieri, L., Pelosi, G., & Koren, I. (Sep. 2007). Countermeasures against branch target buffer attacks. Workshop on Fault Diagnosis and Tolerance in Cryptography (FTDC), 75-79. IEEE.
Agrawal, D., Baktir, S., Karakoyunlu, D., Rohatgi, P., & Sunar, B. (May 2007). Trojan Detection using IC Fingerprinting. IEEE Symposium on Security and Privacy (SP '07), 296-310. IEEE. doi:10.1109/SP.2007.36.
Altschuler, F., & Zoppis, B. (Jan. 2008). Embedded System Security: An Overview and Analysis of Attack Profiles and Defense Strategies. Electronic Engineering & Product World, 6, 115-117. Retrieved from http://caod.oriprobe.com/order.htm?id=14835253&ftext=base.
Appenzeller, D. P. (1995). Formal verification of a PowerPC Microprocessor. ICCD '95: Proceedings of the 1995 International Conference on Computer Design, 79-84. IEEE Computer Society.
Asonov, D., & Agrawal, R. (May 9, 2004). Keyboard Acoustic Emanations. Proceedings of the IEEE Symposium on Security & Privacy (S&P '04), 3-11. IEEE.
Banga, M., Chandrasekar, M., Fang, L., & Hsiao, M. S. (May 4, 2008). Guided test generation for isolation and detection of embedded trojans in ics. GLSVLSI '08: Proceedings of the 18th ACM Great Lakes symposium on VLSI, 363-366. ACM.
Banga, M., & Hsiao, M. S. (Jun. 2008). A region based approach for the identification of hardware Trojans. IEEE International Workshop on Hardware-Oriented Security and Trust (HOST 2008), 40-47. doi: 10.1109/HST.2008.4559047.
Baumgartner, J., Mony, H., Paruthi, V., Kanzelman, R. & Janssen, G. (Oct. 2006). Scalable sequential equivalence checking across arbitrary design transformations. International Conference on Computer Design (ICCD), 2006, 259-266. IEEE.
Bernstein, D. J. (2005). Cache-timing attacks on AES. Retrieved from http://cr.yp.to/antiforgery/cachetiming-20050414.ps.
Biham, E., Carmeli, Y., & Shamir, A. (2008). Bug attacks. Advances in Cryptology—CRYPTO 2008, 221-240. Springer Berlin Heidelberg.
Bonneau, J., & Mironov, I. (2006). Cache-collision timing attacks against AES. Cryptographic Hardware and Embedded Systems-CHES 2006, 201-215. Springer Berlin Heidelberg.
Brickell, E., Graunke, G., Neve, M., & Seifert, J. P. (Feb. 2006). Software mitigations to hedge AES against cache-based software side channel vulnerabilities. IACR ePrint Archive, Report 2006/052. Retrieved from http://eprint.iacr.org/eprint-bin/getfile.pl?entry=2006/052&version=20060214:163143&file=052.pdf.
Carretero, J., Chaparro, P., Vera, X, Abella, J., & González, A. (Jun. 2009). End-to-end register data-flow continuous self-test. ACM SIGARCH Computer Architecture News, 37(3), 105-115. ACM.
Chakraborty, R. S., Paul, S., & Bhunia, S. (Jun. 2008). On-demand transparency for improving hardware Trojan detectability. IEEE International Workshop on Hardware-Oriented Security and Trust (HOST 2008), 48-50. doi:10.1109/HST.2008.4559048.
Chatterjee, S., Weaver, C., & Austin, T. (Dec. 2000). Efficient checker processor design. MICRO 33: Proceedings of the 33rd Annual ACM/IEEE International Symposium on Microarchitecture, 87-97. ACM.
Colwell, R. P. (Oct. 28, 2005). The Pentium Chronicles: The People, Passion, and Politics Behind Intel's Landmark Chips. Hoboken, NJ: Wiley-IEEE Computer Society.
Coron, J. S. (Jan. 1999). Resistance against differential power analysis for elliptic curve cryptosystems. Cryptographic Hardware and Embedded Systems, 292-302. Springer Berlin Heidelberg.
Dyer, J. G., Lindemann, M., Perez, R., Sailer, R., Van Doorn, L., & Smith, S. W. (Oct. 2001). Building the IBM 4758 Secure Coprocessor. Computer, 34(10), 57-66. IEEE.
Elbaz, R., Champagne, D., Gebotys, C., Lee, R. B., Potlapally, N., & Torres, L. (2009). Hardware mechanisms for memory authentication: A survey of existing techniques and engines. Transactions on Computational Science IV, 1-22. Springer Berlin Heidelberg.
Ferrandi, F., Fummi, F., Pravadelli, G., & Sciuto, D. (Dec. 2003). Identification of design errors through functional testing. IEEE Transactions on Reliability, 52(4), 400-412. IEEE.
Gandolfi, K., Mourtel, C., & Olivier, F. (Jan. 2001). Electromagnetic analysis: Concrete results Cryptographic Hardware and Embedded Systems (CHES), 251-261. Springer Berlin Heidelberg.
Gassend, B., Clarke, D., Van Dijk, M., & Devadas, S. (Nov. 2002). Silicon physical random functions. Proceedings of the 9th ACM conference on Computer and Communications Security, 148-160. ACM.

(56) References Cited

OTHER PUBLICATIONS

Harada, T., & Sasaki, H. (Nov. 25, 1997). Investigation on radiated emission characteristics of multilayer printed circuit boards. IEICE Transactions on Communications, E80-B(11), 1645-1651.
Huang, Y., Guo, R., Cheng, W. T., & Li, J. M. (2008). Survey of scan chain diagnosis. Design & Test of Computers, IEEE, 25(3), 240-248.
IBM. IBM 4764 PCI-X Cryptographic Coprocessor: Feature Overview. Retrieved from http://www-03.ibm.com/security/cryptocards/pcixcc/overview.shtml.
King, S. T., Tucek, J., Cozzie, A., Grier, C., Jiang, W., & Zhou, Y. (2008). Designing and implementing malicious hardware. Proceedings of the 1st USENIX Workshop on Large-Scale Exploits and Emergent Threats (LEET), 5:1-5:8. USENIX Association. Retrieved from https://www.usenix.org/legacy/event/leet08/tech/full_papers/king/king.pdf.
Kocher, P., Jaffe, J., & Jun, B. (Jan. 1999). Differential power analysis. Advances in Cryptology (CRYPTO '99), 388-397. Springer Berlin Heidelberg.
Kömmerling, O., & Kuhn, M. G. (May 1999). Design principles for tamper-resistant smartcard processors. USENIX workshop on Smartcard Technology, 12, 9-20.
Lampson, B. W. (Oct. 1973). A Note on the Confinement Problem. Communications of the ACM, 16(10), 613-615.
Lee, J. W., Lim, D., Gassend, B., Suh, G. E., Van Dijk, M., & Devadas, S. (Jun. 17-19, 2004). A technique to build a secret key in integrated circuits for identification and authentication applications. 2004 Symposium on VLSI Circuits. Digest of Technical Papers. 176-179. IEEE.
Li, J., & Lach, J. (Jun. 9, 2008). At-speed delay characterization for IC authentication and Trojan horse detection. IEEE International Workshop on Hardware-Oriented Security and Trust (HOST 2008), 8-14. doi: 10.1109/HST.2008.4559038.
Mangard, S. (Oct. 3, 2003). Exploiting radiated emissions—EM attacks on cryptographic ICs. Proceedings of Austrian Workshop on Microelectronics (AustroChip), 4 pgs. Article supplied by author.
Mangard, S., Oswald, E., & Popp, T. (2007). Power analysis attacks: Revealing the secrets of smart cards. Secaucus, NJ: Springer-Verlag.
Marchetti, V., & Marks, J. (1974). The CIA and the Cult of Intelligence. New York, NY: Knopf. (Electronic version unavailable, book version is being forwarded to USPTO under separate cover.).
Markoff, J. (Oct. 26, 2009). Old Trick Threatens the Newest Weapons. New York Times. Retrieved from http://www.nytimes.Com/2009/10/27/science/27trojan.html?=r=1/.
McFarland, G. (2006). Microprocessor Design. New York, NY: McGraw-Hill.
De Mulder, E., Buysschaert, P., Ors, S. B., Delmotte, P., Preneel, B., Vandenbosch, G., & Verbauwhede, I. (Nov. 2005). Electromagnetic analysis attack on an FPGA implementation of an elliptic curve cryptosystem. The International Conference on Computer as a Tool (EUROCON 2005), 2, 1879-1882. IEEE.
Neve, M., Seifert, J. P., & Wang, Z. (Mar. 2006). A refined look at Bernstein's AES side-channel analysis. Proceedings of the 2006 ACM Symposium on Information, Computer and Communications Security, p. 369. ACM.
Neve, M., & Seifert, J.P. (2006). Advances on Access-driven Cache Attacks on AES. Proceedings of Selected Areas of Cryptography (SAC), 147-162.
Osvik, D. A., Shamir, A., & Tromer, E. (2006). Cache attacks and countermeasures: the case of AES. Topics in Cryptology—CT-RSA 2006, 1-20. Springer Berlin Heidelberg.
Marks, P. (Jul. 4, 2009). Turning microchips into time bombs. New Scientist, 203(2715), 18-19.
Osvik, D. A., Shamir, A., & Tromer, E. (2006). Other People's Cache: Hyper Attacks on HyperThreaded Processors/Full AES key extraction in 65 milliseconds using cache attacks [PowerPoint slides]. Retrieved from http://www.wisdom.weizmann.il/•tromer/.
Percival, C. (2005). Cache missing for fun and profit. Retrieved from http://www.daemonology.net/papers/htt.pdf.
Quisquater, J. J., & Samyde, D. (2001). Electromagnetic analysis (EMA): Measures and counter-measures for smart cards. Proceedings of the International Conference on Smart Cards: Smart Card Programming and Security (E-smart), 200-210.
Rad, R. M., Wang, X., Tehranipoor, M., & Plusquellic, J. (Nov. 2008). Power supply signal calibration techniques for improving detection resolution to hardware Trojans. Proceedings of the 2008 IEEE/ACM International Conference on Computer-Aided Design, 632-639. IEEE.
Reinhardt, S. K., & Mukherjee, S. S. (May 2000). Transient fault detection via simultaneous multithreading. ACM SIGARCH Computer Architecture News—Special Issue: Proceedings of the 27th Annual International Symposium on Computer Architecture (ISCA '00), 28(2), 25-36. ACM.
Rosenfeld, K., & Karri, R. (2010). Attacks and Defenses for JTAG. IEEE Design & Test, 27(1), 36-47.
Salmani, H., Tehranipoor, M., & Plusquellic, J. (Jul. 27, 2009). New design strategy for improving hardware trojan detection and reducing trojan activation time. IEEE International Workshop on Hardware-Oriented Security and Trust (HOST'09), 66-73. IEEE.
Saputra, H., Vijaykrishnan, N., Kandemir, M., Irwin, M. J., Brooks, R., Kim, S., & Zhang, W. (2003). Masking the Energy Behavior of DES Encryption. Proceedings of the Design Automation and Test in Europe Conference (Date), 84-89. IEEE.
Sarangi, S. R., Tiwari, A., & Torrellas, J. (Dec. 2006). Phoenix: Detecting and Recovering from Permanent Processor Design Bugs with Programmable Hardware. Proceedings of the 39th Annual IEEE/ACM International Symposium on Microarchitecture, 26-37. IEEE.
Shamir, A., & Tromer, E. (Aug. 16, 2004). Acoustic cryptanalysis: On nosy people and noisy machines. Paper presented at The 24rd Annual International Cryptology Conference (CRYPTO 2004) Rump Session, Santa Barbara, CA. Retrieved from http://www.cs.tau.ac.il/~tromer/acoustic/ec04rump/.
Smith, S. (2004). Magic boxes and boots: Security in hardware. Computer, 37(10), 106-109.
Suh, G. E., & Devadas, S. (Jun. 2007). Physical unclonable functions for device authentication and secret key generation. Proceedings of the 44th annual Design Automation Conference (DAC '07), 9-14. ACM. doi:10.1145/1278480.1278484.
Tiri, K., Aciiçmez, O., Neve, M., & Andersen, F. (Jan. 2007). An analytical model for time-driven cache attacks. Fast Software Encryption, 399-413. Springer Berlin Heidelberg.
Tiri, K., & Verbauwhede, I. (Mar. 2005). A VLSI design flow for secure side-channel attack resistant ICs. Proceedings of the Conference on Design, Automation and Test in Europe, 3, 58-63. IEEE Computer Society.
Tiri, K., & Verbauwhede, I. (Mar. 2005). Design method for constant power consumption of differential logic circuits. Proceedings of the Conference on Design, Automation and Test in Europe, 628-633. IEEE.
Tiri, K., & Verbauwhede, I. (2006). A digital design flow for secure integrated circuits. IEEE Transactions on Computer-Aided Design of Integrated Circuits and Systems, 25(7), 1197-1208.
United Stated Department of Defense. (2005). Defense Science Board Task Force on High Performance Microchip Supply. Washington, D.C: Office of the Under Secretary of Defense for Acquisition, Technology, and Logistics.
Vasudevan, S., Viswanath, V., Abraham, J. A., & Tu, J. (2008). Sequential equivalence checking between system level and RTL descriptions. Design Automation for Embedded Systems, 12(4), 377-396.
Verbauwhede, I., Tiri, K., Hwang, D., & Schaumont, P. (May 2006). Circuits and design techniques for secure ICs resistant to side-channel attacks. IEEE International Conference on Integrated Circuit Design and Technology (ICICDT'06), 1-4. IEEE.
Wang, X, Tehranipoor, M., & Plusquellic, J. (Jun. 2008). Detecting malicious inclusions in secure hardware: Challenges and solutions. In Hardware-Oriented Security and Trust, 2008. HOST 2008. IEEE International Workshop on (pp. 15-19). IEEE.

(56) References Cited

OTHER PUBLICATIONS

Yoo, J., & Franklin, M. (2008). Hierarchical verification for increasing performance in reliable processors. Journal of Electronic Testing, 24(1-3), 117-128.

Devadas, S., & Yu, M. (Jan.-Feb. 2010). Secure and robust error correction for physical unclonable functions. Design & Test of Computers, 27(1), 48-65. IEEE.

International Search Report & Written Opinion of the International Searching Authority (US) dated Nov. 25, 2011 for International Application No. PCT/US2011/026516, 7 pgs.

International Preliminary Report on Patentability for International Application No. PCT/US2011/026516, dated Sep. 13, 2012, 7 pgs.

TIPO (Intellectual Property Office, R.O.C.) Search Report for Application No. 100106696 dated May 20, 2015 2 pgs.

\* cited by examiner

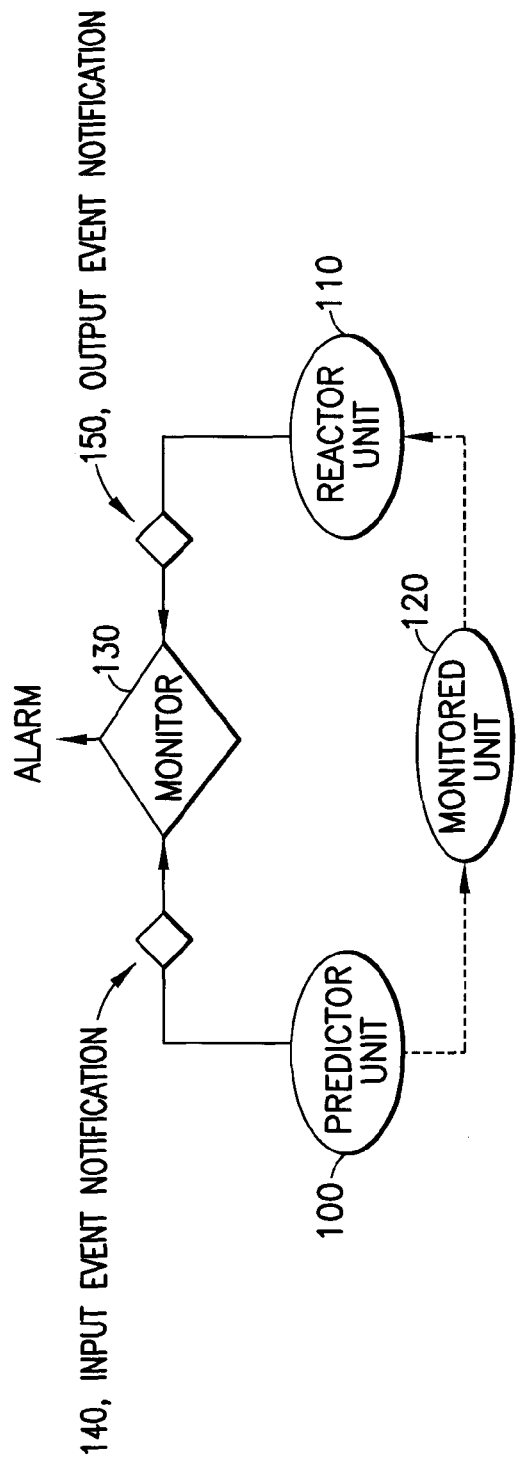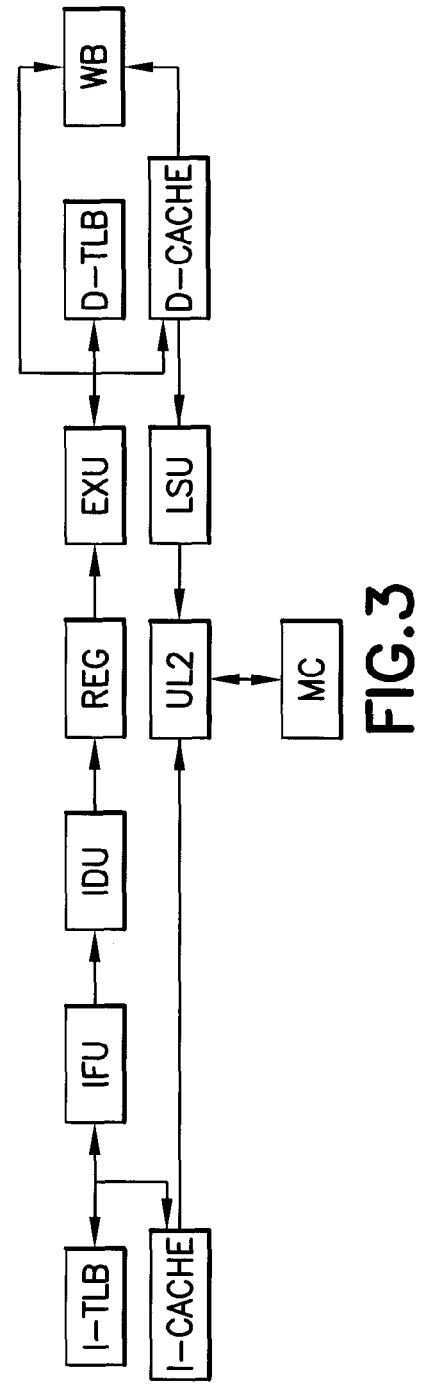

| | |
|---|---|
| INSTRUCTION SET | SUN SPARC |
| MICROARCHITECTURE | |
| INSTRUCTION SUPPLY | 16KB, 8-WAY 1R/1W L1 I-CACHE, 64-ENTRY FA I-TLB (BOTH 2-CYCLE ACCESS, 52 CYCLES ON TLB MISS), NO BRANCH PREDICTION, STALL UNTIL BRANCH RESOLUTION |
| EXECUTION | SINGLE ISSUE, 1 INT ALU, T2 SPARC REGISTER WINDOWS |
| DATA SUPPLY | 8KB, 4-WAY L1 D-CACHE 1RW, 128-ENTRY FA DTLB (BOTH 3 CYCLE ACCESS, 53 CYCLES ON TLB MISS, WRITE-BACK POLICY), UNIFIED 4MB, 16-WAY L2 CACHE, 1 RW (BOTH 12 CYCLE ACCESS, WRITE-BACK POLICY), UNLIMITED MAIN MEMORY AT 250 CYCLE ACCESS LATENCY |
| PIPELINE STAGES | FETCH, CACHE, PICK, DECODE, EXECUTE, READ, BYPASS, WRITEBACK |
| BENCHMARKS | bzip2, gcc, mcf, gobmk, hmmer, TEST INPUTS, BASE COMPILER OPTIMIZATIONS, SPARC COMPILER |

FIG. 10

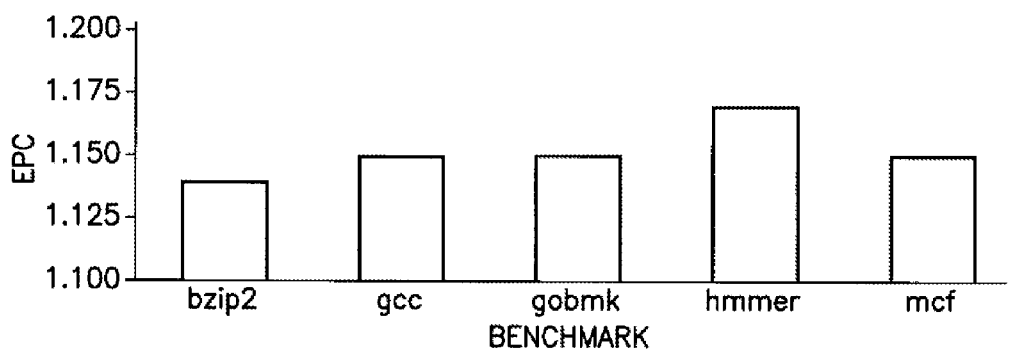

FIG. 8

| ATTRIBUTE | TrustNet | DataWatch | SMART DUPLIC. |
|---|---|---|---|
| DATA CORRUPTER DETECTION | NO | NO | YES |
| CONTROL CORRUPTER DETECTION | NO | YES | YES |
| EMITTER DETECTION | YES | YES | YES |
| FALSE POSITIVES | NO | NO | NO |
| STALLS PROCESSOR | NO | NO | POSSIBLY |
| AREA COST | NEGLIGIBLE | LOW | MODERATE |
| ON-CHIP TRAFFIC | | INCREASES | |
| OFF-CHIP MEMORY | | NO EFFECT | |
| BACKDOOR SOURCE | | CAN BE IDENTIFIED | |

FIG. 9

| MONITORED UNIT | PREDICTOR | REACTOR | INVARIANT | EXAMPLE OF ATTACK THWARTED |
|---|---|---|---|---|
| IDU | IFU | EXU | # OF INSTRUCTIONS IN = # OF INSTRUCTIONS OUT | IDU STALLS THE FETCH UNIT AND SENDS MALICIOUS COMMANDS TO THE EXU |
| IFU | I-CACHE | IDU | # OF INSTRUCTIONS IN = # OF INSTRUCTIONS OUT | IFU SENDS SPURIOUS INSTRUCTIONS TO THE IDU |
| LSU | IDU | D-CACHE | # OF MEMORY OPS ISSUED = # OF MEMORY OPS PERFORMED | LSU PERFORMS SHADOW LOADS |
| I-CACHE | IFU | L2 CACHE | # OF REQUESTED L2 INSTRUCTIONS = # OF IFU REQUESTS THAT MISS | I-CACHE RETURNS SPURIOUS INSTRUCTIONS TO IFU WHILE WAITING ON THE L2 CACHE |
| L2 CACHE | I-CACHE | MMU | # OF REQUESTED INSTRUCTIONS FROM MEMORY = # OF I-CACHE REQUESTS THAT MISS IN L2 | L2 CACHE RETURNS SPURIOUS INSTRUCTIONS WHILE WAITING ON MAIN MEMORY |
| D-CACHE | LSU | L2 CACHE | # OF REQUESTED L2 DATA = # OF LSU REQUESTS THAT MISS | D-CACHE RETURNS FAKE DATA WHILE WAITING ON THE L2 CACHE |
| L2 CACHE | D-CACHE | MMU | # OF REQUESTED DATA FROM MEMORY = # OF D-CACHE REQUESTS THAT MISS IN L2 | L2 CACHE RETURNS SPURIOUS DATA WHILE WAITING ON MAIN MEMORY |
| D-CACHE | LSU | L2 CACHE | # OF L2 CACHE LINES WRITTEN = # OF LSU LINE WRITES ISSUED | D-CACHE SENDS WRITE TO L2 CACHE UNPROMPTED |
| L2 CACHE | D-CACHE | MMU | # OF MEMORY LINES WRITTEN = # OF D-CACHE LINE WRITES ISSUED | L2 SENDS WRITE TO MEMORY UNPROMPTED |

LEGEND: IDU = DECODE UNIT, IFU = FETCH UNIT, LSU = LOAD/STORE UNIT, I-CACHE = INSTRUCTION CACHE, D-CACHE = DATA CACHE, L2 CACHE = UNIFIED L2 CACHE

FIG. 11

| MONITORED UNIT | PREDICTOR | REACTOR | INVARIANT | EXAMPLE OF ATTACK THWARTED | TYPE OF SIGNATURE |
|---|---|---|---|---|---|
| IFU | IDU | I-CACHE | PC RECEIVED = PC COMPUTED | IFU BRANCHES INCORRECTLY | EIGHT BIT SIGNATURE |
| D-TLB | CHECKER D-TLB | LSU | TLB OUTPUT = CHECKER TLB OUTPUT | TLB VIOLATES PERMISSIONS | FULL PERMISSIONS AND TRANSLATION |
| I-TLB | CHECKER I-TLB | IFU | TLB OUTPUT = CHECKER TLB OUTPUT | TLB VIOLATES PERMISSIONS | FULL PERMISSIONS AND TRANSLATION |
| IDU | IFU | LSU | MEMORY OPS ISSUED = MEMORY OPS PERFORMED | DECODER CAUSES SHADOW LOAD/STORE | TWO BIT SIGNATURE |

LEGEND: IFU = FETCH UNIT, IDU = DECODE UNIT, TLB = TRANSLATION LOOKASIDE BUFFER, LSU = LOAD/STORE UNIT, I-CACHE = INSTRUCTION CACHE

FIG. 12

| OPEN SPARC UNIT | ATTACK | POSSIBLE USER LEVEL EFFECT | BACKDOOR TYPE | PROTECTION |
|---|---|---|---|---|
| IFU | FETCH INSTRUCTION FROM WRONG ADDRESS | FETCH A MALICIOUS PROGRAM INSTEAD OF THE ONE THE OS INTENDS | CONTROL CORRUPTER | #10 |
| IFU | FETCH EXTRA INSTRUCTIONS | FETCH A MALICIOUS PROGRAM IN ADDITION TO THE ONE THE OS INTENDS | EMITTER | #2 |
| IDU | EMIT SPURIOUS INSTRUCTIONS | EMIT A SPURIOUS LOAD OR STORE TO PRIVATE INFORMATION | EMITTER | #1 |
| IDU | TRANSFORM NO-OP INTO LOAD OR STORE | ALLOW INAPPROPRIATE LOAD OR STORE | CONTROL CORRUPTER | #13 |
| ITLB | TRANSLATE PAGES INCORRECTLY | TRANSLATE A VALID LOAD INTO A LOAD FROM A MALICIOUS PROGRAM | CONTROL CORRUPTER | #12 |
| ITLB | CHANGE OR IGNORE PERMISSIONS | ALLOW LOADING FROM PAGES WITHOUT PERMISSIONS | CONTROL CORRUPTER | #12 |
| IL1 | LOADS WRONG INSTRUCTION | FETCH A MALICIOUS PROGRAM INSTEAD OF THE ONE OS INTENDS | DATA CORRUPTER | DUPLIC. |
| IL1 | LOADS EXTRA INSTRUCTION | FETCH A MALICIOUS PROGRAM IN ADDITION TO THE ONE THE OS INTENDS | EMITTER | #4 |
| EXU | INCORRECT OPERATION | ALU PRODUCES INCORRECT OUTPUT; WIDESPREAD DAMAGE | DATA CORRUPTER | VERIF. |
| EXU | INCORRECT OPERATION | COMPUTE WRONG ADDRESS | DATA CORRUPTER | VERIF. |
| LSU | LOADS/STORES EXTRA DATA | LOAD/STORE PRIVATE INFORMATION | EMITTER | #3 |
| DL1 | LOADS EXTRA DATA | LOAD PRIVATE INFORMATION | EMITTER | #5 #8 |
| DL1 | LOADS FROM WRONG LOCATION IN UL2 | LOAD PRIVATE INFORMATION | DATA CORRUPTER | DUPLIC. |
| DL1 | STORES EXTRA DATA | EXFILTRATE PRIVATE INFORMATION | EMITTER | #5 #8 |
| UL2 | LOADS EXTRA DATA | LOAD PRIVATE INFORMATION | EMITTER | #6 #7 #9 |
| UL2 | LOADS FROM WRONG LOCATION IN RAM | LOAD PRIVATE INFORMATION | DATA CORRUPTER | DUPLIC. |
| UL2 | LOADS/STORES EXTRA DATA | OVERWRITE OS CRITICAL INFORMATION | EMITTER | #6 #7 #9 |
| MC | LOADS/STORES EXTRA DATA | OVERWRITE OS CRITICAL INFORMATION | EMITTER | DUPLIC. |
| DTLB | TRANSLATES DATA LOCATION INCORRECTLY | TRANSLATE A VALID LOAD INTO A LOAD OF PRIVATE INFORMATION | CONTROL CORRUPTER | #11 |
| DTLB | CHANGE PERMISSIONS | ALLOW LOADING FROM PAGES WITHOUT PERMISSIONS | CONTROL CORRUPTER | #11 |
| DTLB | IGNORES PERMISSIONS | ALLOW LOADING FROM PAGES WITHOUT PERMISSIONS | CONTROL CORRUPTER | #11 |

FIG. 13

SYSTEMS AND METHODS FOR DETECTING ATTACKS AGAINST A DIGITAL CIRCUIT

CROSS-REFERENCE TO RELATED APPLICATIONS

This application claims the benefit of U.S. Provisional Patent Application No. 61/309,194, filed on Mar. 1, 2010, which is hereby incorporated by reference in its entirety.

STATEMENT REGARDING FEDERALLY SPONSORED RESEARCH OR DEVELOPMENT

This invention was made with government support under Grant No. FA 9550-09-1-0389 awarded by the Air Force Office of Scientific Research (AFOSR). The government has certain rights in the invention.

BACKGROUND

Conventional computer security mechanisms focus on software security and implicitly assume that the microprocessor is trustworthy. However, microprocessors are vulnerable to insider attacks in which malicious logic is embedded in the microprocessor hardware. Such attacks may embedded in the microprocessor in the design or fabrication phases of the microprocessor production process.

For example, a hardware designer/attacker could easily introduce a "backdoor" into a microprocessor being fabricated by changing only a few lines of the code used to layout the logic elements. The attacker could modify, for example, an on-chip memory system to send data items it receives to a shadow address in addition to the original address. The embedding of backdoors in a microprocessor can be used to attack confidentiality, e.g., by outputting sensitive information, integrity, e.g., by disabling security checks such as memory protection, and availability, e.g., by shutting down the component based on a timer or external signal.

Because hardware components, including backdoors, are architecturally positioned at the lowest layer of a computational device, it is very difficult to detect attacks launched or assisted by those components. Indeed, it is difficult or impossible to do so at a higher layer, e.g., at the operating system or application level, and there is typically little functionality available in current processors and motherboards to detect such misbehavior. The state of practice is to ensure that hardware comes from a trusted source and is maintained by trusted personnel—a virtual impossibility given the current design and manufacturing realities. In fact, the inability to catch accidental bugs with traditional design and verification procedures, even in high-volume processors, makes it unlikely that hidden backdoors will be caught using the same procedures, as this is an even more challenging task.

Conventional approaches have focused on detecting hardware attacks during the production phase by malicious foundries. Such approaches assume the existence of a "golden netlist" produced during a trustworthy design phase. However, such approaches would not detect attacks embedded during the high-level design phase, as these attacks would be included in the golden netlist.

Other conventional approaches have attempted to build trustworthy systems from untrustworthy components. One such approach involves redundantly performing computations on several untrustworthy components and using "voting" to detect faulty behavior. For example, a number of cores designed by different designers can be used to run the same instructions and the most popular output can be accepted. However, this approach can lead to a significant increase in the size of the design team and can increase the complexity of verifying the design. This approach can also lead to a microprocessor having decreased performance and increased power consumption.

SUMMARY

The embodiments described herein address how microprocessor trust can be strengthened when the microprocessor is manufactured via an untrusted design flow. The disclosed embodiments focus on one of the initial production steps, which is the coding phase of hardware design, i.e., register transfer level (RTL), because a backdoor introduced during the initial phase becomes progressively more difficult to detect as it percolates through optimizations and tools in the later phases.

The embodiments described herein provide a low-overhead, on-chip monitoring system for dynamically detecting malicious behavior in a microprocessor at runtime. The system described herein includes solutions for emitter and control corrupter protection. Also described herein is a partial duplication approach, referred to as "smart duplication," which can be effective against certain types of data corrupters. Also discussed is a "regular duplication" or "complete duplication" approach which can be effective against types of attacks not covered by the other described approaches.

A typical microprocessor design includes a number of on-chip units that perform specific functions, e.g., decode unit, fetch unit, load/store unit (LSU), instruction cache (I-cache), data cache (D-cache), level 2 (L2) cache, etc. The approaches described herein exploit the division of work between these various on-chip units, i.e., the division of microprocessor operations into portions that are handled separately by each of these units. For example, a memory instruction involves a cache unit as well as fetch, decode, and register units. If one of these units behaves maliciously, the entire chain of events is altered. It is unlikely that all of the devices in a chain would simultaneously be acting maliciously, since in most microprocessor developments, there are separate teams of designers responsible for each major unit. Therefore, it is possible to detect malicious behavior without relying on the trustworthiness of any particular unit.

Accordingly, the embodiments disclosed herein provide systems and methods for detecting design-level attacks against a digital circuit which includes various functional units. The system includes a target unit selected from among the functional units for monitoring and a predictor unit. The predictor unit is configured to output predicted event messages based on the events received by the predictor unit. The system further includes a reactor unit selected from among the functional units of the digital circuit which are arranged to receive events after they pass through the target unit. The reactor unit is configured to output actual event messages based on the events received by the reactor unit. The system further includes a monitor unit arranged to receive the predicted event messages from the predictor unit and the actual event messages from the reactor unit. The monitor unit is configured to indicate an alarm based on a comparison of the predicted event messages received from the predictor unit and the actual event messages received from the reactor unit. In certain embodiments, the digital circuit may be a microprocessor. An event can be any occurrence within the digital circuit for which monitoring is desired, e.g., load, store, or fetch operations, instructions, etc.

A predictor unit is provided in certain embodiments. Such a unit may be provided by selecting a functional unit in a microprocessor design or adding a conventional functional unit to the microprocessor design. In either case, the design of the functional unit itself may be modified to provide an event message output function. A predictor unit also may be provided by designing a new functional unit which includes an event message output function and incorporating it into a microprocessor design. A newly-designed predictor unit may have functionality which at least partially duplicates the functionality of a functional unit in a microprocessor design.

A reactor unit is selected in certain embodiments from among the functional units of the microprocessor design. The design of the functional unit itself may be modified to provide an event message output function.

Accordingly, in particular embodiments, the predictor unit may be selected from among the functional units of the digital circuit which are arranged to receive events before they reach the target unit. The predictor unit may be configured to at least partially duplicate the functionality of one of the functional units of the target unit.

The embodiments disclosed herein further provide a method of detecting design-level attacks against a digital circuit. The method includes receiving an event at a predictor unit selected from among the functional units of the digital circuit and outputting from the predictor unit a predicted event message based on the event as received by the predictor unit. The method further includes receiving the event at a target unit selected from among the functional units for monitoring. The method further includes receiving the event at a reactor unit selected from among the functional units of the digital circuit and outputting from the reactor unit an actual event messages based on the event as received by the reactor unit. The method further includes receiving at a monitor unit the predicted event messages from the predictor unit and the actual event messages from the reactor unit. The method further includes determining, in the monitor unit, whether to produce an alarm indication based on a comparison of the predicted event messages received from the predictor unit and the actual event messages received from the reactor unit.

BRIEF DESCRIPTION OF THE DRAWINGS

The above and other objects and advantages of the disclosed subject matter will be apparent upon consideration of the following detailed description, taken in conjunction with accompanying drawings, in which like reference characters refer to like parts throughout, and in which:

FIG. 1 is a block diagram of a monitor triangle arrangement of microprocessor units, including a predictor unit, a monitored unit, a reactor unit, and a monitor unit.

FIG. 3 is a block diagram showing the major units of a microprocessor to which monitoring is to be applied.

FIG. 8 is a graph showing the number of communications per cycle sent between TrustNet monitors during executions of SPEC integer benchmarks.

FIG. 9 is a table summarizing various attributes of implementations described herein.

FIG. 10 is a table summarizing details of a simulation infrastructure used.

FIG. 11 is a table providing details regarding various emitter monitors.

FIG. 12 is a table providing details regarding various corruptor monitors.

FIG. 13 is a table providing details regarding emitter and control corruptor attacks.

DETAILED DESCRIPTION

Figure 2:
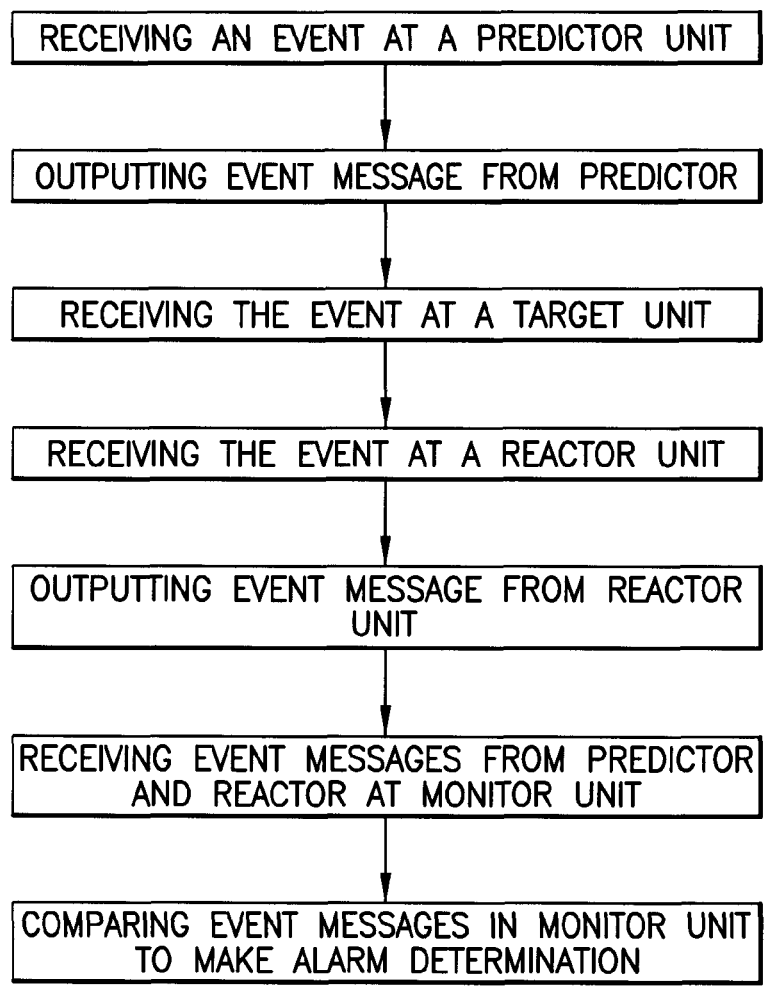
FIG. 2 is a flowchart showing the steps of the operation of a monitor triangle.

The embodiments described herein provide a system for monitoring micro-architectural transactions in on-chip units to detect hardware backdoor attacks. The system is formed primarily of prediction/reaction monitor triangles, as shown in FIG. 1, including a predictor unit 100, a reactor unit 110, and a target unit 120, i.e., the monitored unit, and a monitor unit 130. The predictor unit 100 sends messages (140 and 150) to the monitor unit 130 predicting events that should come out of the target unit 120. If the reactor unit 110 does not receive a predicted event, or if the reactor unit 110 receives an event that was never predicted, then the monitor unit 130 outputs an alarm.

For example, if a decode unit (IDU) of a microprocessor is selected as the target, then any unit that sees events before they reach the decode unit can be selected as the predictor unit, e.g., the fetch unit (IFU). Any unit that sees events after they pass through the target can be selected to be the reactor unit, e.g., the execution unit (EXU). The monitor can reside anywhere on the chip.

The prediction/reaction monitor triangle works as follows. The IFU knows at each cycle whether it has fetched a new instruction. The EXU knows at each cycle whether a valid instruction is advancing through the pipeline. These two pieces of information can be compared and used to corroborate the output of the IDU, thereby preventing the insertion of bogus instructions into the pipeline.

Extra computations are not needed to implement the prediction/reaction monitor triangle, because the information needed to corroborate the output of the target unit is already represented by signals in the prediction and reaction units. Moreover, this arrangement does not require the target unit to communicate with the monitor. Therefore, even if a designer of a target unit knows the design of the monitor, which is likely, the designer is unable to corrupt the operation of the monitor by sending it an erroneous communication from the target unit.

There are two primary types of hardware backdoor attacks: emitter backdoors and corrupter backdoors.

Emitter backdoors, by definition, result in more (or fewer) microarchitectural transactions occurring in the corrupted unit than the instruction being executed specifies. For example, an emitter backdoor in a memory unit may send out load or store operations to a shadow address. When this type of attack is triggered, each memory instruction, upon accessing the cache subunit, sends out two or more microarchitectural transactions to downstream memory units in the hierarchy instead of just one.

A corrupter backdoor involves changing the results of a microarchitectural operation without directly changing the number of microarchitectural transactions. A "control corrupter" backdoor alters the type or semantics of an instruction passing through the unit, which may in turn change the number of microarchitectural transactions in another on-chip unit (at a later cycle). For example, if a decode unit translates a no-op instruction into a store instruction, this will indirectly cause the cache unit to do more work than it would in an uncorrupted microprocessor. A "data corrupter" alters data being used in microarchitectural transactions. For example, a data corrupter may change a value being written to a register file or may change the address of a store request.

Threat Model

The embodiments disclosed herein are based in part on a threat model that makes certain assumptions regarding the nature of hardware-based attacks. A malicious hardware designer has to be strategic in creating backdoors because processor development, especially commercial development, is a carefully controlled process. Generally speaking, the attacker follows two steps: first, design a backdoor for an attack, and second, build a trigger for the attack. Just as in regular hardware design, the attacker has to handle trade-offs regarding degrees of deception, time to completion, verification complexity, and programmability.

One assumption applicable to the detection of hardware-based attacks is "division of work". Typically, a microprocessor team is organized into sub-teams, and each sub-team is responsible for a portion of the design (e.g., fetch unit or load-store unit). Microprocessor design is a highly cooperative and structured activity with tens to hundreds of participants. It may be assumed that any sub-unit team in a design can be adversarial, but that not more than one of the sub-units will be simultaneously compromised.

Another assumption involves access to the hardware design. The disclosed embodiments relate to detecting the handiwork of malicious microprocessor designers, which may include chip architects, microarchitects, RTL engineers and verifiers, and circuit designers. Such workers have approved access to the design, privilege to change the design, and an intricate knowledge of the microprocessor design process and its workings. A malicious designer may be able to provision for a backdoor either during the specification phase, e.g., by allocating "reserved bits" for unnecessary functions, or by changing the RTL. It may be assumed that such efforts will be unnoticed during the implementation phase and after the code reviews are complete. This assumption that code audits will not be able to catch all backdoors is justified, in part, because such audits typically are not successful at catching all inadvertent, non-malicious design bugs.

It may be assumed that the malicious designer is able to insert a backdoor: (i) using only low tens of bits of storage (e.g., latches, flip-flops, etc.); (ii) with a very small number of logic gates; and (iii) without cycle-level re-pipelining. This assumption incorporates the notion that the malicious designer can slip in the hardware backdoor unnoticed past traditional audit methods with very high probability.

It may also be assumed that the backdoor is designed to operate based on a trigger. Although an unintentional bug can have the same consequences as a malicious backdoor, an important difference is that unlike a bug, a backdoor may not be always active. If the backdoor is always active, there is a high chance of detection during random, unit-level design testing. To avoid detection, the malicious designer is likely to carefully control when the backdoor is triggered.

For purposes of the embodiments described herein, it may be assumed that read-only memories (ROM) written during the microprocessor design phase contain correct data. In particular, it may be assumed that microcoded information is correct. The reason for this assumption is that the data in ROMs is statically determined and not altered by the processor's state. For this reason, the security of ROM is an issue which is better solved statically than at runtime, as the embodiments described herein are designed to do.

In addition to the assumptions discussed above, the threat model also involves particular types of attack triggers. Generally speaking, an RTL-level attacker can use two general strategies for triggering an attack: a data-based trigger or a time-based trigger. From the RTL perspective, input data and the passage of time are the factors determining the state of the microprocessor.

One type of data-based trigger is referred to as a "cheat code" (CC). Such triggers involve a malicious designer using a sequence of uncommon bits, embedded in either the instruction or data stream to unlock/lock the backdoor. For instance, a "store" instruction to a specific address and a certain value (i.e., one pairing in a $2^{128}$ space, for a 64-bit microprocessor) can be used as a key to unlock a backdoor. Since the search space is so large, the chance that this trigger is hit by random verification is negligible. There are also variants of this type of trigger in which a sequence of instructions in a program unlocks a trigger. The CC method gives an attacker a very high degree of control on the backdoor but may require a reasonably sophisticated state machine to unlock the backdoor. Further, it requires execution of software, which may not be possible due to access restrictions. In other words, in order to ensure that the trigger instruction(s) is issued, the attacker must execute a program containing the instruction(s). If the attacker cannot obtain access privileges, then this will not be possible.

One type of time-based trigger is referred to as a "ticking time-bomb" (TT). Such triggers involve an attacker designing a circuit to turn on the backdoor after the machine has been powered on for a certain number of cycles. The TT method is very simple to implement in terms of hardware. For instance, a simple 40-bit counter that increments once per processor clock cycle can be used to open a backdoor after roughly 18 minutes of uptime at 1 GHz. Unlike the CC method, TT triggers do not require any special software to open the backdoor. However, like CC triggers, TT triggers can easily escape detection during design validation because random tests are typically not longer than millions of cycles.

In addition to the assumptions and trigger types discussed above, the threat model also involves particular types of backdoors. While the space of possible attacks is limited only by the attacker's creativity and access to the design, attacks can be broadly classified into two categories, based on their runtime characteristics. An attacker can either create a hardware backdoor to do more (or less) "work" than the uncompromised design would, i.e., an "emitter backdoor." Alternatively, the attacker can create a backdoor to do the same amount of work, but work which is different from that of an uncompromised unit, i.e., a "corrupter backdoor." "Work," for purposes of the present discussion, is the microarchitectural sub-operations or communications which must be carried out for the execution of an instruction.

An emitter backdoor in a microarchitectural unit explicitly sends a different number of microarchitectural communication than an uncompromised unit. For example, an emitter backdoor in a memory unit may send out loads or stores to a shadow address. When this type of attack is triggered, each memory instruction, upon accessing the cache subunit, sends out two or more microarchitectural transactions to downstream memory units in the hierarchy. Similar attacks can also be orchestrated for "south bridge" (i.e., input/output control hub) components, such as direct memory access (DMA) and video graphics array (VGA) controllers to exfiltrate confidential data to unauthorized locations.

A corrupter backdoors, on the other hand, changes the results of a microarchitectural operation without directly changing the number of microarchitectural transactions.

There are two types of corrupter backdoors for purposes of the present discussion: "control corrupters" and "data corrupters."

A control corrupter backdoor alters the type or semantics of an instruction during execution in a way that changes the number of microarchitectural transactions somewhere else on the chip (e.g., at a later cycle). This type of attack is similar to an emitter attack, except that instead of simply issuing an extra instruction, the attack uses some part of a legitimate instruction in order to change the number of transactions happening on the chip. For example, if a decode unit translates a no op instruction into a store instruction, this will indirectly cause the cache unit to do more work than it would in an unmodified microprocessor. However, this change will not manifest itself until a later cycle. This is different from an emitter attack, because the decode unit does not insert any new transactions directly. Rather, it decodes exactly the same number of instructions in the modified and unmodified cases, but the value it outputs in the modified case causes the cache unit to do more work a few cycles later.

A data corrupter backdoor alters only the data being used in microarchitectural transactions, without altering the number of events happening on-chip during the life of the instruction. Examples of this include changing the value being written to a register file or changing the address of a store request. For instance, an instruction might be maliciously decoded to turn an addition into a subtraction, causing the arithmetic logic unit (ALU) to produce a difference value instead of a sum value.

Data corrupter backdoors can also be used to change program flow, for example, by changing a value in a register, thus changing the result of a future "branch-if-equal" instruction. However, in such a case, each individual instruction will still do the same amount of work as it ordinarily would. The extra work will not occur until the corrupt instruction has been committed. Thus, each instruction considered individually will appear to be doing the correct amount of work.

There are certain tradeoffs for the attacker in considering an emitter backdoor versus a corrupter backdoor. Emitter attacks are relatively easy to implement and certain types of emitter attacks, e.g., "shadow loads," have very low area and logic requirements. Such attacks also have the property that a user may not see any symptoms of hardware emitters when using applications. This is because the attack can preserve the original instruction stream.

Corrupter attacks, on the other hand, are more complicated to design and harder to hide from the user. In fact, a control corrupter attack requires more logic than a similar emitter attack because rather then simply sending a trigger, it must hide the trigger within a live instruction, which involves extra multiplexing or something equivalent. In such attacks, rather than simply emitting bogus signals, the user's own instructions are altered to invoke the attack. Because the user's instructions are being altered, the attacker must have some knowledge of the binaries being run in order to change the data without alerting the user. If the execution of the backdoor causes the user's program to crash, this violates the secrecy of the attack. Corrupter attacks also tend to scale poorly with data path sizes, because they require decoding of user instructions. In the case of multi-stage decoders, the backdoor itself may require latches and execute over multiple cycles.

Microprocessor Protection

The disclosed embodiments provide, as a solution to the untrusted-designer problem, an on-chip monitoring system that recognizes malicious behavior at runtime regardless of the trigger or unit. Described below are low overhead solutions for emitter and control corrupter protection. Also described below is a form of partial duplication, referred to as "smart duplication," which can be used against some data corrupters backdoors. For data corrupters not protected by any of the above mechanisms, full duplication can be used. The embodiments presented herein are described in the context of simple microprocessors that do not re-order instructions.

As discussed above, emitter backdoors cause more (or less) microarchitectural transactions to occur in the corrupted unit than the instruction specifies. The monitoring system described in this embodiment, which is referred to as "TrustNet," watches the microarchitectural transactions in each unit under consideration to catch this class of attacks. Conceptually, the system detects violations of deterministic communication invariants between on-chip units, which are violated by emitter backdoors.

Referring again to FIG. 1, as discussed above, the monitoring system includes a number of monitored units 120 positioned in prediction/reaction monitor "triangles." A typical monitor triangle includes three on-chip units: a predictor unit 100, a reactor unit 110, and a target unit 120 (i.e., the monitored unit). In this configuration, the predictor unit 100 sends messages or "tokens" (140 and 150) to the monitor unit 130, predicting events that should come out of the target unit 120. The message may be, for example, an individual bit which is sent each time an event is received by the predictor. If the reactor does not receive a predicted event, or if the reactor receives an event that was never predicted, then the monitor indicates an alarm. The operation of a typical monitor triangle is presented in FIG. 2.

The target unit of the monitor triangle can be any one of a number of on-chip units. For example, the instruction decode unit (IDU), as shown in FIG. 3, may be selected as a target unit. In such a case, the predictor unit can be any unit that sees events before they reach the IDU, such as, for example, the instruction fetch unit (IFU). The fetch unit sees every instruction before it reaches the decode unit. The reactor unit can be any unit that sees events after they pass through the target unit. For example, the execution unit (EXU) can be selected to be the reactor unit in this example, because that unit always receives information about instructions after they pass through the decode unit. The monitor can reside anywhere on the chip.

In this example, the IFU knows each cycle whether or not it has fetched a new instruction. Likewise, the EXU knows at each cycle whether or not a valid instruction is advancing through the pipeline. Having these two sources of information corroborate each other prevents the IDU from inserting bogus instructions into the pipeline. Nothing extra has to be computed to make this determination, because this information is already represented by signals in the respective units.

One aspect of this design is that the target unit never communicates with the monitor. Therefore, even if the designer of a particular unit X knows the design of the monitor (which is likely), the designer is unable to corrupt both unit X and the monitor of unit X. For this reason, it is preferable that the monitor of X should not be physically part of unit X.

It is assumed in the threat model, as discussed above, that only one sub-team involved in the design of the microprocessor is corrupt and therefore, an attacker cannot corrupt two independent units on the chip. The monitoring system disclosed herein ensures that the system is secure against these anticipated threats, as the following discussion makes clear.

Consider, for example, a monitor set up to watch a particular unit X. There are four units involved in this monitoring: the predictor of X (referred to as P); the reactor to X (referred to as R); unit X itself; and the monitor of unit X (referred to as M). The attacker, who is presumed to be on only one subteam, can choose one and only one of these items to corrupt. In order to cause a confidentiality or integrity attack in unit X, the attacker would have to choose to corrupt X itself. However, in that case units P, R, and M would all be untampered with, and the attack would be caught at runtime by the monitor triangle including units P, R, and M.

Alternatively, the attacker could instead tamper with units P or R (but not both). However, in either case such an attack would be caught at runtime, because units P and R would disagree with each other. The last possibility would be for the attacker to corrupt unit M to cause an availability attack. However, because unit M contains only one (or a few) logic gates, it is too small to contain a cheat code or ticking time bomb. Unit M has so few states (usually none) and input bits (usually two) that it can easily be verified statically by exhaustive enumeration.

As discussed above, control corrupters change the semantics of an instruction during execution. The same predictor/reactor scheme described above to catch emitter attacks, also works to detect control corrupter attacks, because these attacks either cause reactions (i.e., microarchitectural transactions) which are not predicted or prevent transactions which are predicted. This embodiment of the monitoring system, which is referred to as "DataWatch," is an extension of the TrustNet embodiment described above.

DataWatch uses a monitoring triangle configuration similar to the TrustNet embodiment. However, instead of transmitting individual bits to monitor units, signatures (e.g., hashes, parity bits, slices) are passed to monitor units that check for equivalence. For example, in the case of the decoder, a two-bit signature is enough to define whether an instruction involves a load, a store, both, or neither (i.e., two bits for four cases). An equality check on the signatures from the predictor unit and the reactor unit is enough to confirm an on-chip invariant, namely that the number of each type of regular memory operation that enter the IDU equals the number of each type of memory operation that exit the IDU. This prevents, for example, an attack that exfiltrates data by converting no ops into store instructions.

Data corrupter attacks, as discussed above, change only the data that is sent in on-chip communications. These backdoors are fundamentally different from emitter backdoors and control corrupters because the amounts and types of communications between units during the execution of an instruction is identical to that of a correctly functioning chip. The monitor triangle, while very efficient for recognizing amounts and types of transactions, does not work well for this case, because data corrupter attacks cannot be recognized without duplicating some of the computational logic that has been corrupted. For example, if the execution unit (EXU) produces an incorrect sum, the fact that the sum is wrong cannot be known without duplicating, or otherwise performing the functions of, the arithmetic logic unit (ALU).

However, data corrupter attacks have some similarities with transient errors that can occur in microprocessors. It is sufficient in many cases to duplicate select computational logic in order to protect the RTL design, because standard memory structures (e.g., RAMs) are not susceptible to RTL-level attacks. This type of minimal duplication, which may be referred to as "smart duplication," can be used in a case-by-case way to protect any units (e.g., memory control unit) which are not covered by the DataWatch system or any units which may be considered vulnerable to data corrupter attacks.

This use of partial duplication allows for protection against data corrupter attacks. However, it does this at the possible cost of processor stalls and extra area. Moreover, as explained previously, in most domains data corrupter attacks would likely be considered infeasible due to the required advance knowledge regarding the binaries that will be run in the future during the RTL design phase.

FIG. 9 includes a table that summarizes some of the attributes of the described embodiments. None of these embodiments have a problem with false positives (i.e., false alarms), because they use invariants which can be easily determined statically in non-speculative, in-order microprocessors. Using these techniques in designs with advanced speculative techniques, such as prefetching, may make false positive avoidance non-trivial. False negatives (i.e., missed attacks) are only a problem if multiple signals in the DataWatch technique are hashed to save space, because two different values may hash to the same key, thus tricking the equality checker. However, such hashing is not required because the space requirement of the baseline DataWatch system is fairly low.

Case Study

Figure 4:
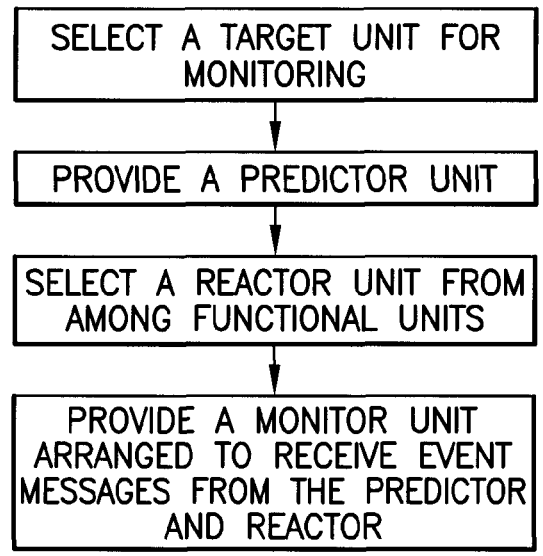
FIG. 4 is a flowchart showing the steps of implementing a monitor triangle in a digital circuit design.

To demonstrate the principles of the TrustNet and DataWatch embodiments, the case study presented below describes how these techniques can be applied to a hypothetical, non-speculative, in-order microprocessor. The in-order microprocessor used in this study closely models the cores and cache hierarchy of the OpenSPARC T2 microprocessor, with the exception of the cross bar network between core and memory system, the thread switching unit, and the chip system units such as the clock and test units. For this study, the units in the processor core are partitioned as described in the OpenSPARC T2 documentation, and the open source RTL code is used to identify the predictors and reactors for each unit. The basic technique is presented in the flowchart of FIG. 4. The following are the TrustNet monitoring triangles implemented in the study, categorized by the target unit being monitored:

1 Instruction decode unit (IDU): The primary responsibility of the IDU is to decode instructions. Predicted by the IFU and reacted to by the EXU, the IDU monitor confirms each cycle that a valid instruction comes out of the IDU if and only if a valid instruction entered the IDU. This monitor detects any attack wherein the IDU inserts spurious instructions into the stream. In the case of branch and jump instructions, which do not go all the way through the pipeline, the information travels far enough for the EXU to know that a branch or jump is occurring. This monitor can be used to support a speculative microprocessor if the monitor can reliably identify speculative instructions.

2 Instruction fetch unit (IFU): The primary responsibility of the IFU is to fetch instructions. Predicted by the instruction cache (I-Cache) and reacted to by the IDU, this monitor confirms each cycle that a valid instruction comes out of the IFU if and only if an instruction was fetched from the I-Cache. This invariant catches any attack wherein the IFU sneaks instructions into the stream that did not come from the I-Cache. The monitor operates on the level of single instructions as opposed to whole cache lines. While the whole line is loaded into the I-Cache from the L2, the I-Cache knows when individual instructions are being fetched into the IFU.

3 Load-store unit (LSU): The LSU handles memory references between the SPARC core, the L1 data cache and the L2 cache. Predicted by the IDU and reacted to by the data cache (D-Cache), this monitor confirms each cycle that a memory action (i.e., load or store) is requested if and only if a memory instruction was fed into the LSU. This catches shadow load or shadow store attacks in the LSU. The microprocessor in this study uses write merging, which involves several incoming write requests being merged into a single outgoing write request. However, this does not pose a problem, because there is a signal generated each cycle stating whether or not a load/store is being initiated, so even if several writes are merged over several cycles, there is still a signal generated each cycle for the monitoring system.

4 Instruction cache (I-Cache): Predicted by the IFU and reacted to by the unified L2 Cache, this monitor confirms each cycle that an L2 instruction load request is received in the L2 Cache if and only if that load corresponds to a fetch that missed in the I-Cache. The IFU can predict this because it receives an "invalid" signal from the I-Cache on a miss. An I-Cache miss immediately triggers an L2 request and stalls the IFU, so there is no issue with cache line size. The IFU buffers this prediction until the reaction is received from the L2 Cache. This catches shadow instruction loads in the I-Cache.

5 Data cache (D-Cache): Predicted by the LSU and reacted to by the L2 Cache, this monitor is the same as the monitor #4 but it watches data requests instead of instruction requests.

6 Level 2 Cache (L2 Cache): Predicted by the I-Cache and reacted to by memory management unit (MMU), this is the same as monitor #4 but is one level higher in the cache hierarchy.

7 L2 Cache: Predicted by the D-Cache and reacted to by the MMU, this is the same as monitor #5, but is one level higher in the cache hierarchy.

8 D-Cache: Predicted by the LSU and reacted to by the L2 Cache, this is the same as monitor #5, but it monitors writes instead of reads. It is necessary that two separate monitors watch reads and writes, because if a single monitor counted only the total number of reads and writes, then an attacker could convert a write into a read without being noticed. This would cause old data to be loaded into the cache and prevent the new value from being written.

9 L2 Cache: Predicted by the D-Cache and I-Cache and reacted to by the memory management unit (MMU), this monitor confirms that line accesses in the MMU correspond to line accesses issued by the level 1 caches. This monitor prevents shadow loads/stores executed by the L2 Cache.

The following are the DataWatch monitoring triangles being implemented in the study, categorized by the unit being monitored:

10 Instruction fetch unit (IFU): Predicted by the IDU and reacted to by the I-Cache, this monitor confirms each cycle that if the I-Cache receives a valid PC value it is the same as the value computed in the IFU. This requires some duplication of PC logic, but does not require any extra storage. This monitor prevents attacks wherein the IFU maliciously changes the control flow.

11 Data translation look-aside buffer (TLB): Predicted by the checker data TLB and reacted to by the LSU, this monitor confirms each cycle that the outputs of the data TLB match the outputs of the checker data TLB. This prevents data TLB attacks, such as permissions violations or page mistranslation. This is close to what might be considered "smart duplication" because the signatures are so large. However, this was nevertheless included in the DataWatch implementation and simulation.

12 Instruction translation look-aside buffer (TLB): Predicted by the checker instruction TLB and reacted to by the IFU, this is the same as monitor #11 but for the instruction TLB rather than the data TLB.

13 Instruction decode unit (IDU): Predicted by the IFU and reacted to by the LSU, this monitor confirms that the number of instructions decoded into memory operations matches the number of memory instructions fetched. For the microprocessor used in this study, this monitor required that the IFU look at a few bits of the instruction. The monitoring occurs at a one cycle lag, so the timing on the critical path is unaffected. The IFU stores a few of the bits from the fetched instruction in flip-flops until the next cycle, when a prediction can be made with a few logical gates. For this case study, this is the only type of control corrupter decoder attack that is addressed. This the case, because in the simple microprocessor of the study, the only types of signals the decoder can cause are loads in stores. If, for example, the decoder changed an add to a subtract, this would be a data corrupter, because it would not alter the number of transactions in the execution unit, just the value of the output. In more complex microprocessors, decode units may be responsible for more types of transactions and might require additional monitoring triangles. When customizing a DataWatch system to fit a particular design, it is important up front to identify what types of signals each unit is responsible for.

Microarchitecture

Figure 5:
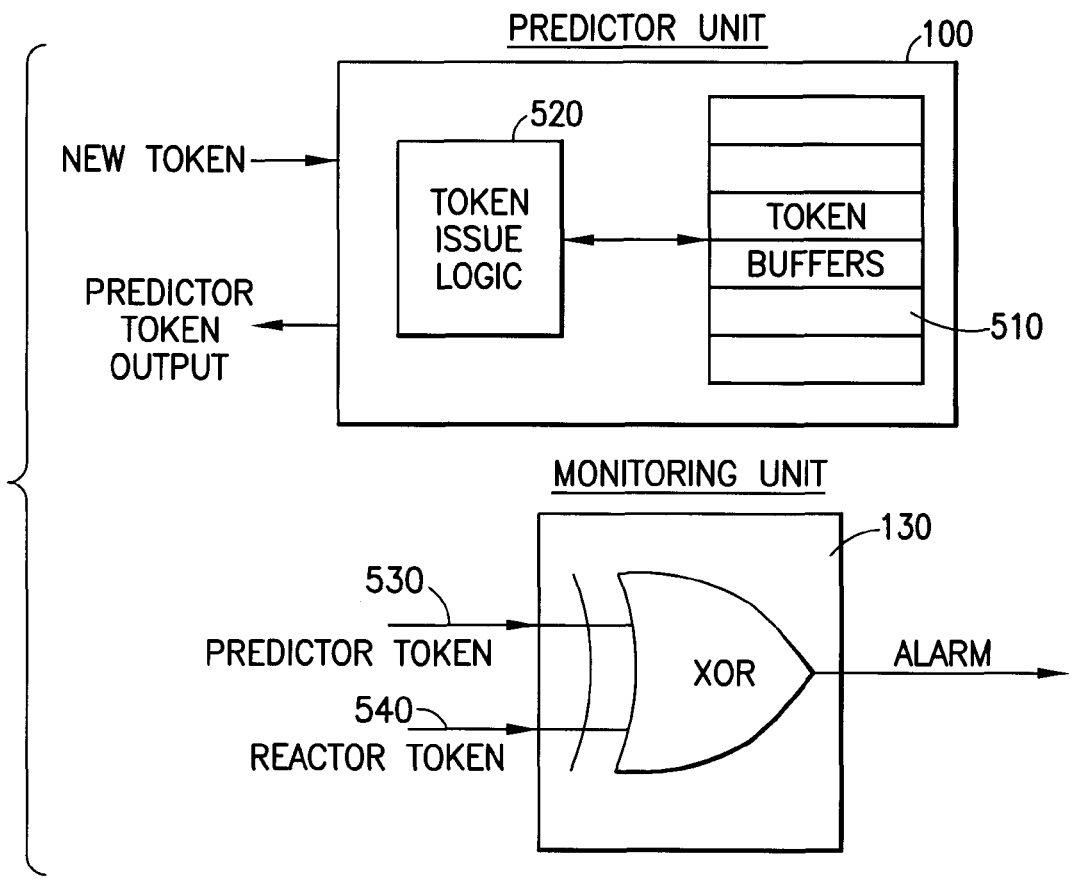
FIG. 5 is a block diagram showing the microarchitecture of the predictor and monitor units.

The microarchitecture of the predictor and monitor units are depicted in FIG. 5. The predictor unit includes: (i) event or "token" buffers 510 for delaying the issue of tokens to the monitor unit 130; and (ii) token issue logic 520 to determine when buffered events can be released from the event buffers 510. The predictor unit 100 requires a small buffer, because it is possible for multiple predictions to happen before a reaction happens, and these predictions must be remembered for that duration. These buffers can be sized a priori to avoid overflows. The monitor unit 130 checks if events appear at the predictor input 530 and the reactor input 540 of the monitor unit 130 during the same cycle, e.g., using an exclusive OR operation (XOR). Alternatively, the buffer could be incorporated in the monitor unit or as a separate unit When using TrustNet embodiments to catch emitter backdoors, it is preferable that the monitors fit simply into the pipeline without any complex timing or buffering. Because predictions and reactions must arrive at the monitor during the same cycle, timing must be controlled in the face of non-determinism, which arises in all microprocessors due to cache misses, etc. This is handled differently in the case of the memory hierarchy versus the case of the pipeline.

The pipeline offers a natural lock-step manner for coordinating events. If a reaction stage is N pipeline steps down from a prediction stage, then the prediction stage has a size N buffer that advances only when that stage of the pipeline advances. Because the monitoring network advances in lock-step with pipelined events, timing is not a problem. For example, if the third pipeline stage wants to send a prediction to a monitor that lies in the fifth pipeline stage, this takes two pipeline advancements (no need for forwarding). If the third stage stalls for any reason, the prediction also stalls and gets buffered. When the data from the third stage reaches the fifth stage, the prediction token also arrives. Of course, in such a case, the prediction token should not pass through the fourth stage but should instead remain in the prediction buffer, with a bit denoting that it is semantically in the fourth stage.

In the case of the cache hierarchy, on the other hand, it is necessary to know which predictions correspond to which reactions, because it is possible for memory requests to be handled out of order. This requires time-stamping of packets, for example with a one-byte local time signature copied from an 8-bit modular counter.

When using DataWatch embodiments, one solution for catching control corrupter backdoors in translation look-aside buffers (TLBs) is to simply have two (or more) designers design the same TLB and compare their outputs each cycle. Because TLBs tend to be power-hungry, highly-associative structures, duplication is not a good idea. Instead of complete duplication, a new TLB microarchitecture may be used that provides significant protection without the costs associated with duplication.

The TLBs contain page translation and permissions information not available elsewhere on chip. A TLB has a content-addressable memory (CAM) that translates a virtual page into a physical page, which is then stored in a table (i.e., RAM) with the corresponding permissions information for that physical page.

Figure 6:
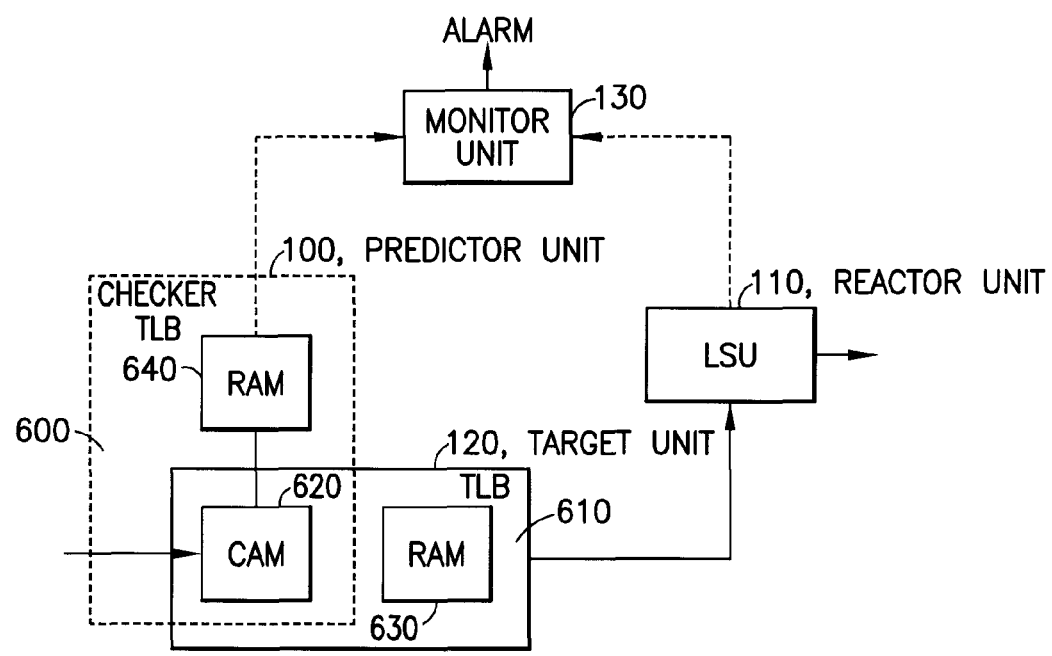
FIG. 6 is a block diagram of a monitor triangle having a predictor unit that partially duplicates the functionality of a translation look-aside buffer.

As shown in FIG. 6, this embodiment includes a "checker TLB" 600, which is a direct-mapped structure having the same functionality the target unit 120, which in this example is the translation look-aside buffer 610 (TLB). A directed-mapped structure is used, because such structures use only a fraction of the power of an associative one. The TLBs in the case study presented herein are fully associative. Functionality was added to the CAM 620 of the TLB 610 to output the line number of the output. This allowed use of a checker TLB 600 that uses these line numbers. Thus, instead of having one CAM and a direct-mapped RAM, the system can have one CAM 620 which provides matching entries to two RAM's (630 and 640) in parallel. One of the RAMs 630 communicates with the rest of the chip, while the other RAM 640 only gives outputs to the monitor unit 130 (i.e., which acts in effect as an equality verifier). The equality check occurs at a one-cycle latency, so the values are buffered for that cycle.

The CAM could possibly be tampered with so that it would send incorrect line numbers to the checker TLB. This would cause the equality check to fail because data from one line of the RAM of the original TLB would be compared to data from a different line of the second RAM, causing an alarm to be indicated. Therefore, the checker TLB described herein turns a potential confidentiality or integrity attack into, at worst, an availability attack. An availability attack of this sort would be easy to catch at verification time, because the passing of the line number is simple, combinatorial logic that can be checked by exhaustive enumeration.

Furthermore, while the duplication described above is much more expensive than the simpler monitor used for emitter backdoor protection, it is much less expensive than complete duplication and offers strong protection for a highly vulnerable unit.

Evaluation

The goals of the evaluation described herein were to: (1) study the accuracy and coverage provided by TrustNet and DataWatch; (2) measure the increases in on-chip network congestion from DataWatch running on real programs; and (3) measure the area overheads of both mechanisms. It is not necessary to discuss performance, because the proposed mechanisms do not stall the pipeline, memory system, or any other on-chip unit, and the security packets travel on a dedicated network. Thus, these techniques would not be expected to have a significant impact on performance.

The following discussion addresses the general applicability and limitations of the solutions provided by the disclosed embodiments, including related aspects and potential extensions.

The implementations of TrustNet and DataWatch described herein were designed for a simple, in-order microprocessor. While the methodology is applicable to any in-order microprocessor, this exact implementation is specific to the microprocessor of the case study. In order to fit TrustNet and DataWatch to other designs, it is necessary to analyze the units at a high level and determine what the natural predictors and reactors are.

The embodiments described herein operate at the register transfer level (RTL) and thus can only catch attacks that operate on the RTL level. Post-RTL, circuit level attacks, such as tampering with the voltage thresholds on certain transistors, would not be caught by these techniques. The embodiments described herein cover the cores and the cache hierarchy of the OpenSPARC T2 microprocessor, but do not cover debug/test logic or miscellanies, such as clock distribution. Additionally, side-channel attacks are also not covered.

As noted above, the embodiments described herein operate under the assumption that at most one of the microprocessor design teams is corrupt. The monitor configuration is a triangle (i.e., a complete graph of size three). If one allows for n different sub-teams to be corrupt and fully coordinated, then the solution becomes more complicated.

In order for a TrustNet system to catch n coordinated attackers, it is necessary to form a complete graph of size n+2. A premise of such a system is that two honest units must communicate with each other to compare information and detect discrepancies. If there are at most n+1 nodes and n have been tampered with, then at most one of them is honest, and the one honest node receives only invalid information. Therefore, the size of the graph must be at least n+2 so that there are at least two honest nodes. If the graph is not complete, i.e., if it is missing an edge, then it is possible that the missing edge connects the only two honest nodes. In that case, the two honest nodes receive only invalid information. Therefore, the graph must be complete. Since complete graphs contain $n(n+1)/2$ bidirectional edges, the TrustNet solution, when applied to n attackers for a microprocessor with u units, has a fundamental communication overhead of $n(n+1)u \propto n^2 u$.

Therefore, it may be concluded that TrustNet and DataWatch can be generalized for multiple, coordinated attacking sub-teams. However, the complexity of such generalized implementations are correspondingly increased.

The decision of how to handle an alarm is to a certain extent domain-specific. Nevertheless, the following discussion presents possible ways of managing alarm indications from monitor units. The simplest response to an alarm is to kill the defective processor, which has the effect of turning a confidentiality or integrity attack into an availability attack. In highly secure domains, this may be desirable to prevent exfiltration of sensitive data. Additionally, in a heterogeneous processor (i.e., diversity) setting, it may be desirable to kill the defective core. The TrustNet and DataWatch infrastructure can greatly simplify the task of making microprocessors tamper-corrective. For example, if an alarm is indicated, the problem can be corrected by rolling back to the last committed instruction. Additionally, the instruction that was being executed in the corrupted unit can be flagged as a cheat code and logged for future execution. Alarms also may be stored in memory and/or output from the microprocessor to a user.

There are several ways to generalize the TrustNet and DataWatch architecture. The multi-threaded case is a relatively simple generalization that can be implemented by making the packets n-wide for an n-threaded core. Assuming one thread is not supposed to alter the microarchitectural transactions of another thread, the n-wide packet can function semantically as n independent monitors. The out-of-order case is more complicated as it requires mechanisms to handle reordering of predictor/reactor tokens during execution. Handling speculative microprocessor configurations would also require some modifications. However, the principles of the embodiments discussed above can be applied to work in such a case without any false alarms by identifying what the lifetime of an instruction is (i.e., whether it is prefetched, speculated or committed) and monitoring it for that lifetime. There are other advanced features of modern microprocessors, and each may require certain modifications. For example, some microprocessors have a privileged or supervisor state that is separate from the permissions governed by the TLB. Such additions open the door for control corrupter attacks and therefore warrant additional monitoring triangles.

The embodiments discussed herein were simulated using a simplified model of Sun Microsystems' OpenSPARC T2 microarchitecture. While these experiments and analysis were performed on this particular simulated core, the techniques can be applied to any microprocessor that has memory hierarchy and pipelines. In the case study discussed above, RTL hardware implementation was used: (1) to construct well-formed, meaningful attacks to test the resiliency of the system; and (2) to systematically determine the number of on-chip units that can be covered by the disclosed techniques. To measure congestion, a cycle-accurate simulator was used that exactly models one core of the simulated microprocessor. Details of the simulation infrastructure are summarized in the table shown in FIG. 10. All the TrustNet and DataWatch monitor triangles discussed above were modeled, as presented in the tables shown in FIGS. 11 and 12, including the partially duplicated TLBs.

To determine how good TrustNet and DataWatch are at protecting against attacks on microprocessors, one must consider the microprocessor attack/vulnerability space. To measure the attack/vulnerability space, it is observed that an on-chip unit is only vulnerable to backdoors in-so-far as its interfaces are threatened. What goes on inside the unit doesn't matter as long as everything that goes in and out of the unit is correct. If all inputs and outputs are the same as in an uncorrupted chip, then there is no problem, because there has been no corruption or exfiltration of data. Therefore, to identify the points of vulnerability, one records the interfaces between on-chip units. The efficacy of the solution is then determined by whether or not these interfaces are protected from attacks using TrustNet and DataWatch.

FIGS. 7A-7D show the distribution of shared interfaces between units within the overall chip, the processor core, the memory elements and system elements respectively, in the RTL implementation of the OpenSPARC T2. Each measurement in the grid represents the number of signals that enter and leave a unit within the processor. All communication is normalized to the unit that has the highest communication. Very small bars (i.e., below 0.1) signify connections that are not part of instruction processing, but rather contain miscellaneous information, such as power settings, clock distribution, etc. Attacks on such connections may be possible at fabrication, e.g., by misclocking a particular unit, but would be difficult to achieve through the RTL code. Most of these miscellaneous signals are not present in the case study discussed above. Thus, the microprocessor in the case study is somewhat simpler than a real OpenSPARC T2 and lacks some of the less central features, such as power management and floating point operations.

Figure 7A:
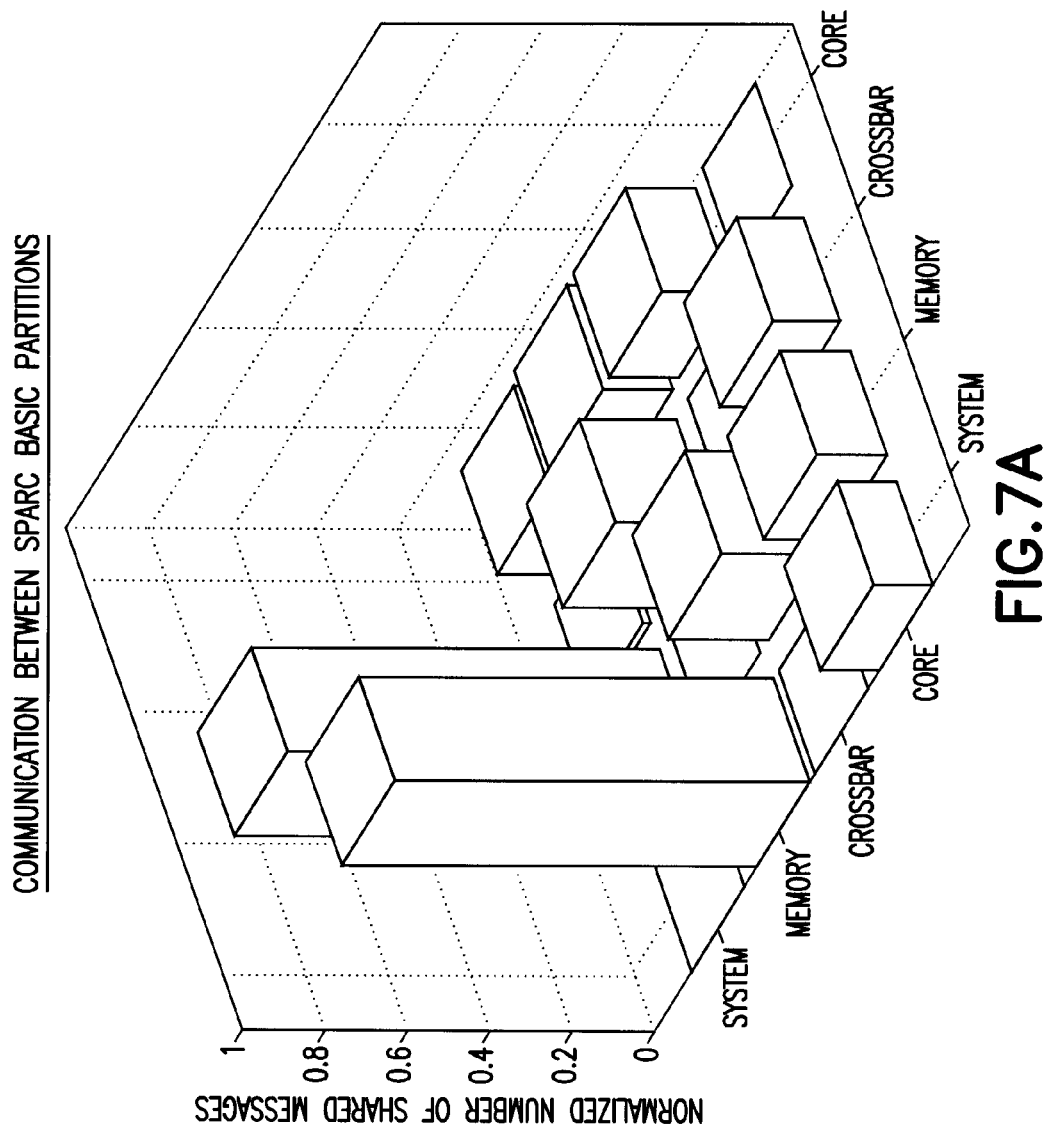
FIGS. 7A-7D are graphs showing the distribution of shared interfaces between units within the overall chip, the processor core, the memory elements and system elements respectively.
Figure 7B:
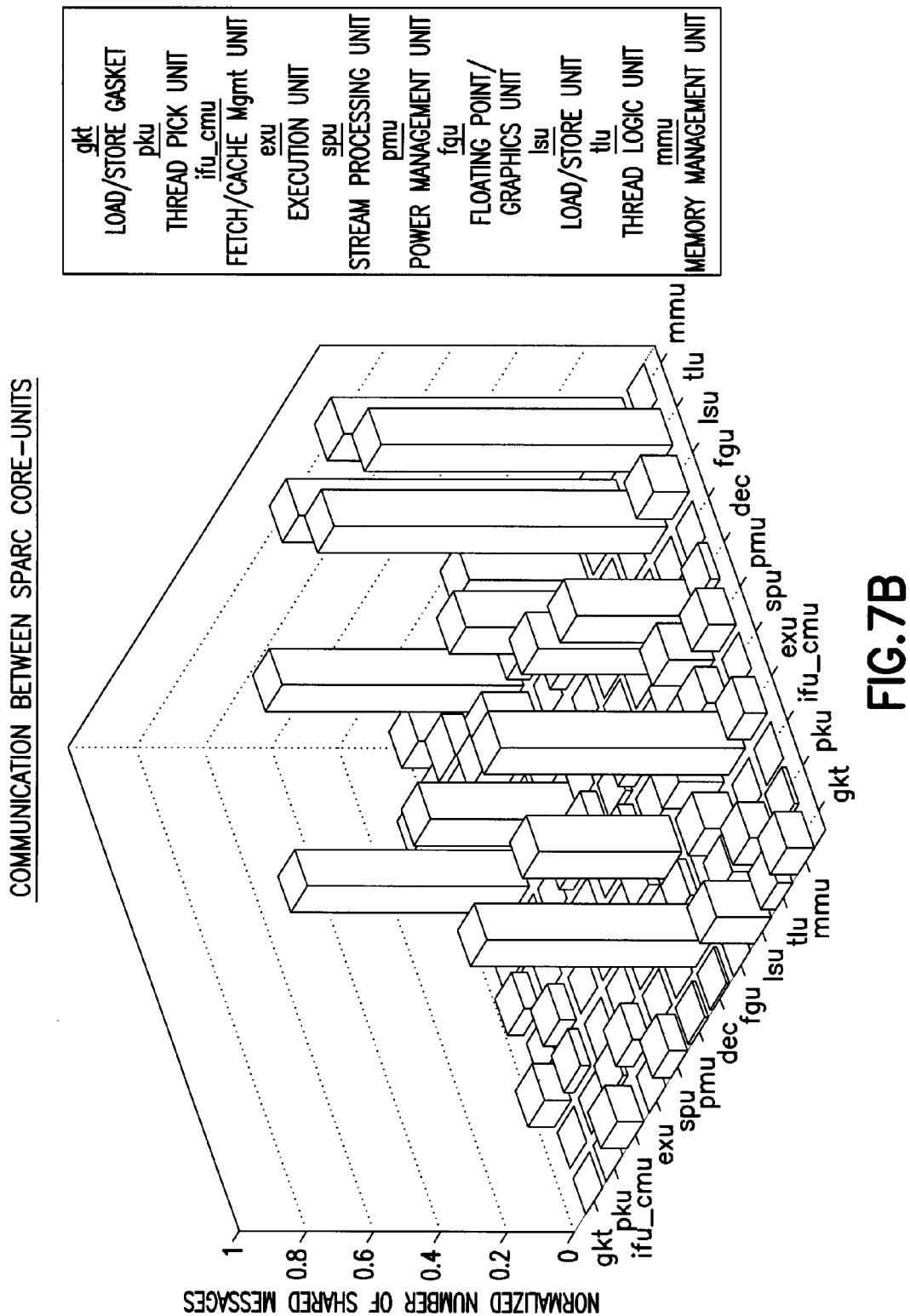
Figure 7C:
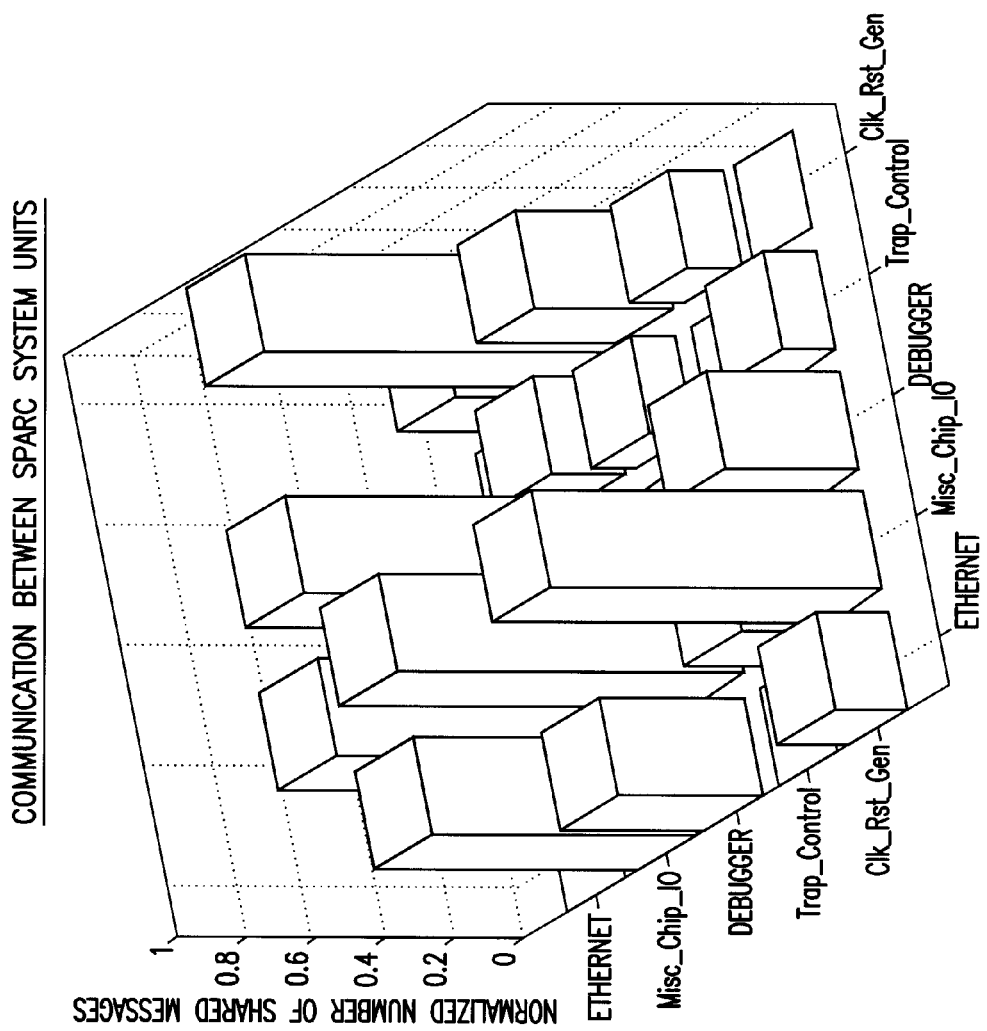
Figure 7D:
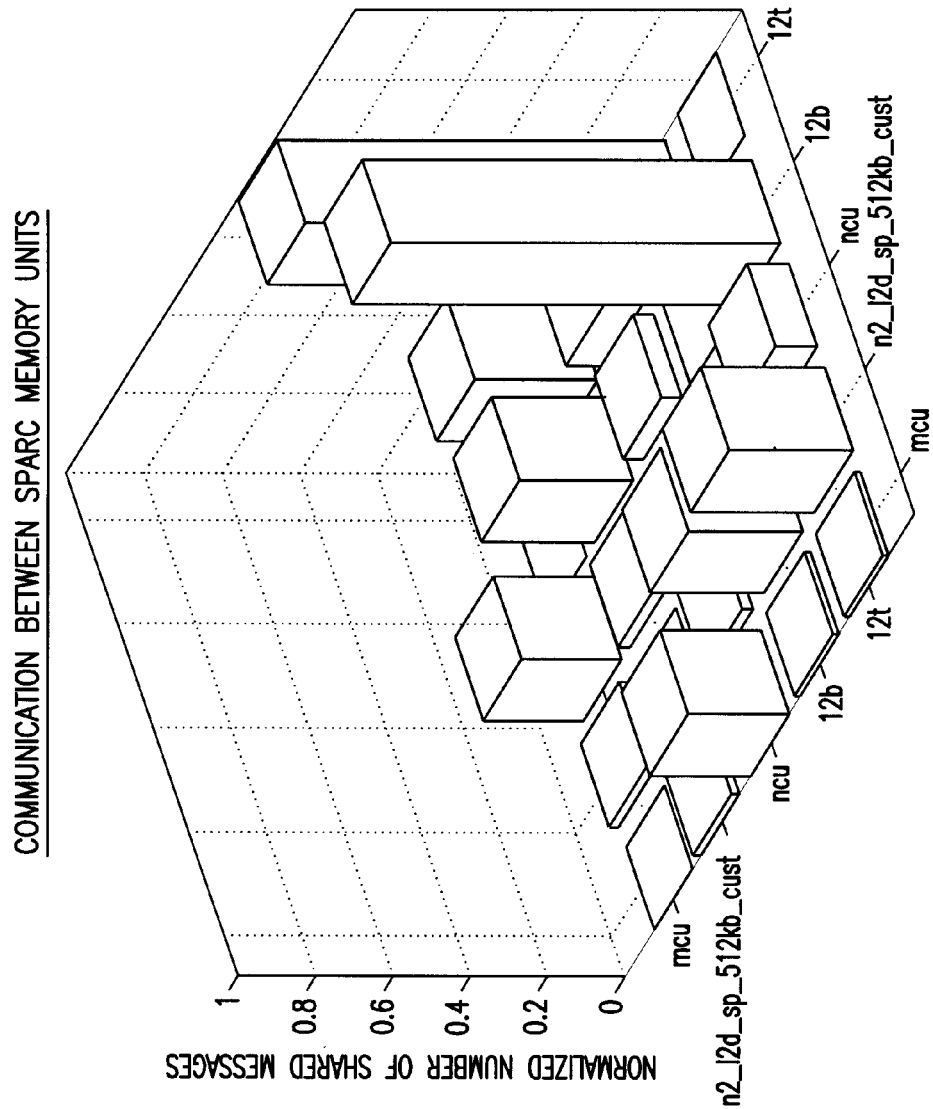

As can be seen from the tables shown in FIGS. 11 and 12, which describe known emitter and corrupter monitors respectively, and FIGS. 7A-7B, which describe all of the interfaces, all of the units in the core having significant communications (i.e., more than 0.1) are monitored by TrustNet and Data-Watch. For this study, manual analysis was used to identify which signals on the interfaces can be altered to cause emitter and control corrupter attacks in order to verify that TrustNet and DataWatch can cover these signals. Based on this analysis, most of the vulnerable interfaces can be protected against the known attacks. However, manual analysis may not uncover all possible attack scenarios, so it is desirable to automate this process to achieve full coverage.

An automated process could be used to analyze hardware description language (HDL) code defining the design of the microprocessor, enumerate the interfaces and some basic relationships between functional units, and determine which functional units should be monitored, i.e., the target units. For example, the target units could be selected based on the quantity of communication at the interfaces of the functional units. The process can then determine which units to select as predictor units and reactor units, based on their location in the event flow relative to the corresponding target unit, i.e., predictor units see events before they pass through the target unit, and reactor units see events after they pass through the corresponding target unit. Based on this, the automated process can determine where to insert monitoring units, which would typically be in proximity to the corresponding predictor, target, and reactor units.

While TrustNet and DataWatch were used to the processor cores and the cache hierarchy against the identified emitter and control corrupter attacks, these techniques were not used in the case study for the floating point logic, memory controller units, crossbars and the miscellaneous logic. In practice, it is believed that formal, i.e., mathematical, verification can be used to cover floating point logic and the crossbar. The case study also did not cover the miscellaneous logic such as power management unit and the stream processing unit, but these units have very little contact with other units on chip (i.e., less than 0.1 normalized), and it is thought unlikely that these units significantly increase attack vulnerability. It is difficult to cover the memory controller unit (MCU) with TrustNet, because the MCU communicates only with the main memory and there are no units available to serve as a reactor. The simplest way to handle this special case would be to duplicate the MCU control logic, which serves the same purpose as complete duplication, but without increasing memory bandwidth.

Based on the study of the OpenSPARC T2 RTL discussed above, emitter and control corrupter attacks were constructed, as described in the table shown in FIG. 13, and injected into the simulator to measure the percentage of false negatives and false positives. Data corrupter attacks were not implemented in the study, because these attacks, such as the one which alters the address of an otherwise valid load, may require logic duplication. In such a case, the address (or a hash of the address) could be forwarded to make sure the address has not been altered. However, this was not done in the implementation discussed above, which protected only against emitter and control corrupter attacks. As stated above, the study did not involve corrective or rollback measures based on the alarms. It was sufficient for the purposes of the study to simply record the alarms. In addition, as noted above, one way to handle MCU would be to duplicate the MCU control logic, rather than the whole structure, which can be done without increasing the memory bandwidth. This is indicated in the table of FIG. 13 as "duplic."

As expected, the study resulted in all emitter and control corrupter attacks being caught in all cases. This demonstrated that the system provided coverage for all of the units to which it was applied for various types of attacks. The study also measured the overall accuracy of the solution with no attacks, as indicated by the percentage of cycles in which there were no false positive results. This measurement indicated that for all of the tests run during the study, no false positives occurred. It is important that there are no false positives and no false negatives, because the former could cripple the system and the latter would be a breach of security.

Since TrustNet and DataWatch do not stall the pipeline or otherwise increase computational cycles, the most relevant cost of the system is the increase in on-chip network traffic. This increase depends on the architecture, but it can be bounded in general if one assumes a cache hierarchy and one or more pipelined computational units. The total amount of traffic in the worst case is bounded above according to the following equation:

Traffic≤2*(MemoryOps*MemoryMonitors+ Instructions*PipelineMonitors)

The factor of two in the above equation comes from the fact that each monitoring event has two packets: a prediction and a reaction. This is an estimated upper bound, and it is expected that actual systems will produce much less traffic than this estimate. However, this upper bound demonstrates the scalability of the design. This linear scaling with the instructions per cycle (IPC) and the pipeline depth is optimal (up to constant factors) given that the goal is to monitor every pipeline stage and every instruction.

The monitoring network traffic generated by real programs was experimentally measured to answer two questions: (1) are there programs that create floods of traffic (near the worst-case bound); and (2) do high-level differences between programs affect the amount of traffic caused by the monitors? The expectation was that the running of different programs would have little impact on the amount of traffic produced by the monitors.

As FIG. 8 confirms, the differences between programs do not significantly impact the events per cycle (EPC) of the monitoring system. FIG. 8 shows the number of communications per cycle sent between TrustNet monitors during executions of SPEC integer benchmarks. The number of communications per cycle is deterministic because the monitors behave deterministically and the instructions are in order. The traffic generated is relatively low (i.e., always less than 2 IPC). It is also stable across the benchmarks (i.e., between 1.1 and 1.2 IPC). This tends to indicate that a single model works for all programs and that program-adaptive features are unnecessary. These numbers would be higher for a program that, for example, consisted of only store instructions or only branch instructions, but such behavior is not typical of real programs.

The following discussion provides bounds on the general area cost of TrustNet and DataWatch and estimates the cost of the implementation in the case study. Bytes of storage are used as a metric, because the computational logic required is trivial (e.g., XORs, buffer logic, or equality check over a few bits). The area cost of the monitors comes from the fact that an event must be stored by the monitoring system from the time it reaches the predictor to the time it reaches the reactor. In complex processors, this time can be variable. It is necessary to have buffers large enough to store all events that are still incomplete. This number depends on the architecture but is known a priori for a given microprocessor. Therefore:

BufferPackets≤MaxMemoryRequests+MaxInstructionsInPipeline

In the single-issue, in order case, each packet is a single bit. Additionally, if there are N threads sharing a pipeline, the data must be N bits wide instead of one, so that no thread-swapping attacks are possible. So, in general:

Area≤(MaxMemoryRequests+MaxInstructionsInPipeline)*PacketSize

Specifically, TrustNet, as described in the table of FIG. 11, employs nine different monitor triangles. It is sufficient to use a one-byte prediction buffer for each triangle at the input (although in most cases a smaller buffer would suffice). Analysis of an OpenSPARC T2 core shows that it is impossible for a one-byte prediction buffer (i.e., eight slots) to overflow. This results in a total of at most nine bytes of storage. Using maximal scaling, i.e., conservative scaling with no microarchitectural optimizations, would require 9*8=72 bytes to cover an eight-threaded OpenSPARC T2 core. An OpenSPARC T2 chip, which contains eight cores, would require eight copies of TrustNet for a total of 72*8=576 bytes of storage.

DataWatch, as described in the table of FIG. 12, employs four additional triangles in addition to those used by TrustNet. The two triangles for the pipeline use eight-wide prediction buffers of one-byte signatures, for a total of eight bytes each. If one creates the two triangles on all eight cores, that results in 2*8*8=128 total bytes of storage. Including the duplicate direct-mapped TLBs (both data and instruction) adds a total of 128+64=192 duplicated TLB entries. If this is done for each of the eight cores and each line is given a generous nine bytes of storage, this adds 8*9*192=13824 bytes of storage. Thus, DataWatch uses a total of 128+13824=13952 bytes of storage on top of TrustNet, for a total of 13952+576=14528 bytes, or a little under 15 KB of storage (i.e., total storage for 8 cores and the cache hierarchy).

Certain embodiments described above may include electronic hardware, software, or a combination of both. Software may be embodied on a computer-readable medium, such as a disk or memory, which may be non-transitory.

Other embodiments, extensions, and modifications of the ideas presented above are comprehended and should be within the reach of one versed in the art upon reviewing the present disclosure. Accordingly, the scope of the disclosed subject matter in its various aspects should not be limited by the examples presented above. The individual aspects of the disclosed subject matter, and the entirety of the disclosed subject matter should be regarded so as to allow for such design modifications and future developments within the scope of the present disclosure. The disclosed subject matter can be limited only by the claims that follow.

The invention claimed is:

1. A system for detecting attacks against a hardware-implemented circuit, the hardware-implemented circuit comprising functional units, the system comprising:

a micro-architectural target unit selected from among the functional units of the hardware-implemented circuit for monitoring; a micro-architectural predictor unit, selected from among the functional units of the hardware-implemented circuit, configured to output predicted event messages representative of predicted micro-architectural output produced by the target unit in response to micro-architectural input provided by the predictor unit to the target unit; a micro-architectural reactor unit selected from among the functional units of the hardware-implemented circuit arranged to receive actual micro-architectural output caused by the target unit in response to the micro-architectural input provided by the predictor unit to the target unit, the reactor unit further configured to output actual event messages representative of the actual micro-architectural output caused by the target unit in response to the micro-architectural input provided by the predictor unit to the target unit; and a micro-architectural monitor unit arranged to receive the predicted event messages from the predictor unit and the actual event messages from the reactor unit; wherein the monitor unit is configured to indicate an alarm based on a comparison of the predicted event messages received from the predictor unit and the actual event messages received from the reactor unit; and wherein the predicted event messages each comprise one of: i) a predicted event bit generated by the predictor unit for each micro-architectural transaction predicted to be caused by the target unit in response to the micro-architectural input provided by the predictor unit to the target unit, and wherein, when the predicted event messages each comprise a respective predicted event bit, the actual event messages each comprise an actual event bit generated by the reactor unit for each actual micro-architectural transaction caused by the target unit in response to the micro-architectural input provided by the predictor unit to the target unit, and wherein a bit total discrepancy between a predicted number of bits predicted by the predictor unit and an actual number of bits generated by the reactor unit is indicative of an emitter backdoor implementation in the target unit; or ii) a predicted event value generated by the predictor unit representative of a predicted instruction type for a predicted instruction provided by the target unit to the reactor unit in response to the micro-architectural input provided by the predictor unit to the target unit, and wherein, when the predicted event message each comprise a respective predicted event value, the actual event messages each comprise an actual event value generated by the reactor unit representative of an actual instruction type for an actual instruction provided by the target unit to the reactor unit in response to the micro-architectural input provided by the predictor unit to the target unit, and wherein an instruction type value discrepancy between the predicted event value generated by the predictor unit and the actual event value generated by the reactor unit is indicative of a corruptor backdoor implementation in the target unit.

2. The system of claim 1, wherein the predictor unit is selected from among the functional units of the hardware-implemented circuit which are configured to receive events before they reach the target unit.

3. The system of claim 1, wherein the predictor unit is configured to at least partially duplicate the functionality of the target unit.

4. The system of claim 3, wherein the target unit is a translation look-aside buffer and the predictor unit is a checker translation look-aside buffer comprising a content addressable memory, which is shared with the translation look-aside buffer, and a direct-mapped random access memory.

5. The system of claim 1, wherein the target unit is selected based at least in part on a quantity of communication occurring at an interface of the target unit.

6. The system of claim 1, wherein the predictor unit and the reactor unit are each configured to send at least one indicator bit as an event message to the monitor unit each time an event occurs, and wherein the monitor unit is configured to compare the received indicator bits.

7. The system of claim 1, wherein the predictor unit and the reactor unit are each configured to send a plurality of bits as an event message, the event message identifying a particular instruction from among a plurality of instructions.

8. The system of claim 1, wherein the system comprises a plurality of target units, each target unit being associated with a corresponding predictor unit, reactor unit, and monitor unit.

9. The system of claim 1, wherein if the monitor unit does not receive an actual event message corresponding to a received predicted event message or if the monitor unit receives an actual event message for which the monitor unit has not received a corresponding predicted event message, then the monitor unit indicates an alarm.

10. The system of claim 1, wherein the hardware-implemented circuit is shut down in response to an alarm indication from the monitor unit.

11. The system of claim 1, wherein, in response to an alarm indication from the monitor unit, the last committed instruction is rolled back.

12. The system of claim 1, wherein, in response to an alarm indication from the monitor unit, the last committed instruction is flagged as a cheat code and stored in a log.

13. The system of claim 1, wherein the hardware-implemented circuit is a heterogeneous processor, and wherein a particular core of the processor which is identified as a source of an alarm indication is shut down in response to an alarm indication.

14. The system of claim 1, wherein the predictor unit immediately precedes the target unit in an event flow of the hardware-implemented circuit.

15. The system of claim 1, wherein the reactor unit immediately follows the target unit in an event flow of the hardware-implemented circuit.

16. The system of claim 1, wherein the hardware-implemented circuit is a microprocessor, the target unit comprises an instruction decode unit, the predictor unit comprises an instruction fetch unit, and the reactor unit comprises an execution unit.

17. The system of claim 1, wherein the predictor unit comprises an event buffer for delaying the output of the predicted event messages to the monitor unit, and further comprises message issuance logic to determine when to release the predicted event messages from the buffer.

18. The system of claim 17, wherein the determination of when to release the predicted event messages from the buffer is based at least in part on a number of pipeline steps separating the predictor unit from the reactor unit.

19. The system of claim 17, wherein the determination of when to release the predicted event messages from the buffer is based at least in part on time stamps included in each predicted event message and each actual event message.

20. The system of claim 1, wherein the monitor unit comprises an event buffer for delaying the predicted event messages received from the predictor unit, and further comprises message issuance logic to determine when to release the predicted event messages from the buffer for comparison to the actual event messages received from the reactor unit.

21. The system of claim 1, wherein the attack is triggered by a cheat code received by the digital circuit.

22. The system of claim 1, wherein an attack is triggered by a counter based on a clock of the hardware-implemented circuit.

23. A microprocessor comprising the system of claim 1.

24. A method of detecting attacks against a hardware-implemented circuit, the hardware-implemented circuit comprising functional units, the method comprising: selecting a micro-architectural target unit from among the functional units of the hardware-implemented circuit for monitoring; providing a micro-architectural predictor unit, selected from among the functional units of the hardware-implemented circuit, configured to output predicted event messages representative of predicted micro-architectural output produced by the target unit in response to micro-architectural input provided by the predictor unit to the target unit; selecting a micro-architectural reactor unit from among the functional units of the hardware-implemented circuit arranged to receive actual micro-architectural output caused by the target unit in response to the micro-architectural input provided by the predictor unit to the target unit, the reactor unit further configured to output actual event messages representative of the actual micro-architectural output caused by the target unit in response to the micro-architectural input provided by the predictor unit to the target unit; and providing a micro-architectural monitor unit arranged to receive the predicted event messages from the predictor unit and the actual event messages from the reactor unit; wherein the monitor unit is configured to indicate an alarm based on a comparison of the predicted event messages received from the predictor unit and the actual event messages received from the reactor unit; and wherein the predicted event messages each comprise one of: i) a predicted event bit generated by the predictor unit for each micro-architectural transaction predicted to be caused by the target unit in response to the micro-architectural input provided by the predictor unit to the target unit, and wherein, when the predicted event messages each comprise a respective predicted event bit, the actual event messages each comprise an actual event bit generated by the reactor unit for each actual micro-architectural transaction caused by the target unit in response to the micro-architectural input provided by the predictor unit to the target unit, and wherein a bit total discrepancy between a predicted number of bits predicted by the predictor unit and an actual number of bits generated by the reactor unit is indicative of an emitter backdoor implementation in the target unit; or ii) a predicted event value generated by the predictor unit representative of a predicted instruction type for a predicted instruction provided by the target unit to the reactor unit in response to the micro-architectural input provided by the predictor unit to the target unit, and wherein, when the predicted event message each comprise a respective predicted event value, the actual event messages each comprise an actual event value generated by the reactor unit representative of an actual instruction type for an actual instruction provided by the target unit to the reactor unit in response to the micro-architectural input provided by the predictor unit to the target unit, and wherein an instruction type value discrepancy between the predicted event value generated by the predictor unit and the actual event value generated by the reactor unit is indicative of a corruptor backdoor implementation in the target unit.

25. The method of claim 24, wherein the predictor unit is selected from among the functional units of the hardware-implemented circuit which are configured to receive events before they reach the target unit.

26. The method of claim 24, wherein the predictor unit is configured to at least partially duplicate the functionality of the target unit.

27. A method of detecting attacks against a hardware-implemented circuit, the hardware-implemented circuit comprising functional units, the method comprising: receiving an event at a micro-architectural predictor unit selected from among the functional units of the hardware-implemented circuit; outputting from the predictor unit a predicted event message representative of predicted micro-architectural output produced by a micro-architectural target unit in response to micro-architectural input, corresponding to the event, provided by the predictor unit to the target unit; receiving the event at the target unit, selected from among the functional units of the hardware-implemented circuit, for monitoring; receiving at a micro-architectural reactor unit, selected from among the functional units of the hardware-implemented circuit, actual micro-architectural output caused by the target unit in response to the micro-architectural input provided by the predictor unit to the target unit; outputting from the reactor unit an actual event message representative of the actual micro-architectural output caused by the target unit in response to the micro-architectural input provided by the predictor unit to the target unit; receiving at a micro-architectural monitor unit the predicted event message from the predictor unit and the actual event message from the reactor unit; and determining, in the monitor unit, whether to produce an alarm indication based on a comparison of the predicted event message received from the predictor unit and the actual event message received from the reactor unit; wherein the predicted event messages each comprise one of: i) a predicted event bit generated by the predictor unit for each micro-architectural transaction predicted to be caused by the target unit in response to the micro-architectural input provided by the predictor unit to the target unit, and wherein, when the predicted event messages each comprise a respective predicted event bit, the actual event messages each comprise an actual event bit generated by the reactor unit for each actual micro-architectural transaction caused by the target unit in response to the micro-architectural input provided by the predictor unit to the target unit, and wherein determining, in the monitor unit, whether to produce the alarm indication comprises determining whether a bit total discrepancy between a predicted number of bits predicted by the predictor unit and an actual number of bits generated by the reactor unit, indicative of an emitter backdoor implementation in the target unit, exists; or ii) a predicted event value generated by the predictor unit representative of a predicted instruction type for a predicted instruction provided by the target unit to the reactor unit in response to the micro-architectural input provided by the predictor unit to the target unit, and wherein, when the predicted event message each comprise a respective predicted event value, the actual event messages each comprise an actual event value generated by the reactor unit representative of an actual instruction type for an actual instruction provided by the target unit to the reactor unit in response to the micro-architectural input provided by the predictor unit to the target unit, and wherein determining, in the monitor unit, whether to produce the alarm indication comprises determining whether an instruction type value discrepancy between the predicted event value generated by the predictor unit and the actual event value generated by the reactor unit, indicative of a corruptor backdoor implementation in the target unit, exists.

28. The system of claim 1, wherein the each micro-architectural transaction comprises a valid instruction processed by the target unit.

* * * * *